United States Patent
Darrah et al.

(10) Patent No.: US 12,545,576 B2
(45) Date of Patent: *Feb. 10, 2026

(54) SYSTEMS AND METHODS FOR GENERATING HYDROGEN AND MAGNETITE FROM ROCK

(71) Applicant: Ohio State Innovation Foundation, Columbus, OH (US)

(72) Inventors: Thomas Darrah, Westerville, OH (US); Vikram Rao, Chapel Hill, NC (US); Colin Whyte, Grove City, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,248

(22) Filed: May 23, 2024

(65) Prior Publication Data
US 2024/0308843 A1    Sep. 19, 2024

Related U.S. Application Data

(63) Continuation of application No. 18/302,702, filed on Apr. 18, 2023, now Pat. No. 12,006,212, which is a
(Continued)

(51) Int. Cl.
*C01B 3/00* (2006.01)
*C01B 3/04* (2006.01)
(Continued)

(52) U.S. Cl.
CPC ........... *C01B 3/061* (2013.01); *C01B 3/04* (2013.01); *C01F 5/24* (2013.01); *C01G 49/08* (2013.01);
(Continued)

(58) Field of Classification Search
CPC .................................... C01B 3/61; C01B 3/04
See application file for complete search history.

(56) References Cited

U.S. PATENT DOCUMENTS

| 4,798,717 A | 1/1989 | Morency |
| 12,006,212 B2 * | 6/2024 | Darrah .................... C01B 3/04 |

(Continued)

FOREIGN PATENT DOCUMENTS

| EP | 0236480 B1 | 7/1992 |
| JP | 2020-032422 A | 3/2020 |

(Continued)

OTHER PUBLICATIONS

Kularatne et al. "Simultaneous ex-situ CO2 mineral sequestration and hydrogen production from olivine-bearing mine tailings." Applied Geochemistry 95, p. 195-218 (2018).
(Continued)

*Primary Examiner* — Paul A Wartalowicz
(74) *Attorney, Agent, or Firm* — K&L Gates LLP

(57) ABSTRACT

Systems and methods for sequestering carbon, evolving hydrogen gas, producing iron oxide as magnetite, and producing magnesium carbonate as magnesite through sequential carbonation and serpentinization/hydration reactions involving processed olivine- and/or pyroxene-rich ores, as typically found in mafic and ultramafic igneous rock. Precious or scarce metals, such nickel, cobalt, chromium, rare earth elements, and others, may be concentrated in the remaining ore to facilitate their recovery from any gangue material.

20 Claims, 9 Drawing Sheets

Related U.S. Application Data continuation of application No. 17/815,914, filed on Jul. 28, 2022, now abandoned.

(60) Provisional application No. 63/203,814, filed on Jul. 30, 2021.

(51) Int. Cl.

| | | |
|---|---|---|
| *C01B 3/06* | (2006.01) | |
| *C01F 5/24* | (2006.01) | |
| *C01G 49/08* | (2006.01) | |
| *C22B 1/00* | (2006.01) | |
| *C22B 3/00* | (2006.01) | |
| *C22B 23/00* | (2006.01) | |
| *C22B 26/12* | (2006.01) | |
| *C22B 34/32* | (2006.01) | |
| *C22B 59/00* | (2006.01) | |

(52) U.S. Cl.
CPC .............. *C22B 1/00* (2013.01); *C22B 23/005* (2013.01); *C22B 23/0415* (2013.01); *C22B 26/12* (2013.01); *C22B 34/32* (2013.01); *C22B 59/00* (2013.01); *C01B 2203/0272* (2013.01); *C01B 2203/06* (2013.01); *C01B 2203/1258* (2013.01); *C01B 2203/86* (2013.01)

(56) References Cited

U.S. PATENT DOCUMENTS

| | | |
|---|---|---|
| 2004/0087178 A1 | 5/2004 | Koyanagi |
| 2008/0299024 A1 | 12/2008 | Gorset |
| 2009/0308731 A1 | 12/2009 | Zabolotny |
| 2010/0313794 A1 | 12/2010 | Constantz |
| 2015/0152784 A1 | 6/2015 | Kumar |
| 2015/0157979 A1 | 6/2015 | Park |
| 2017/0159190 A1* | 6/2017 | Fournier .................. C01F 5/30 |
| 2018/0030593 A1* | 2/2018 | Policandriotes ...... C23C 16/045 |
| 2019/0131645 A1 | 5/2019 | Jahnke |

FOREIGN PATENT DOCUMENTS

| | | |
|---|---|---|
| JP | 2021-513460 A | 5/2021 |
| WO | 2013100333 A1 | 7/2013 |
| WO | WO 2017/222396 A1 | 12/2017 |
| WO | WO 2019153047 A1 | 8/2019 |
| WO | 2021138653 A1 | 7/2021 |
| WO | 2023239797 A1 | 12/2023 |

OTHER PUBLICATIONS

Ehlmann, et al., "Ambient and cold-temperature infrared spectra and IRD patterns of ammoniated phyllosilcates and carbonaceous chondrite meteorites relevant to Ceres and other solar system bodies," Meteorites Planetary Science, vol. 53, No. 9 (2018).

Wang, et al., "Pyroxene control H2 production and carbon storage during water-periodotite-CO2 hydrothermal reactions," International Journal of Hydrogen Energy, vol. 44, p. 26835-26847; Sep. 11, 2019.

Bassez, Marie-Paule, "Anoxic and Oxic Oxidation of Rocks Containing Fe(II)Mg-Silicates and Fe(II)-Monosulfides as Source of Fe(III)-Minerals and Hydrogen. Geobiotropy", Origins of Life and Evolution of the Biosphere, Kluwer Academic Publishers, vol. 47, No. 4, Mar. 31, 2017 (Mar. 31, 2017), pp. 453-480.

* cited by examiner

SYSTEMS AND METHODS FOR GENERATING HYDROGEN AND MAGNETITE FROM ROCK

CROSS-REFERENCE TO RELATED APPLICATIONS

This application is a continuation of U.S. application Ser. No. 18/302,702 filed Apr. 18, 2023, which is a continuation of U.S. patent application Ser. No. 17/815,914 filed Jul. 28, 2022, which claims the benefit of U.S. Provisional Patent Application No. 63/203,814 filed Jul. 30, 2021. The entire contents of all of the above applications are incorporated herein by reference.

FIELD OF THE DISCLOSURE

One or more embodiments of this disclosure generally relate to systems and methods that produce hydrogen, generate magnetite, and/or derive additional desired products from ores containing olivine or pyroxene (such as mafic and/or ultramafic rocks) through pre-selected chemical processes. In one or more embodiments, the systems and methods facilitate carbonization and/or serpentinization/hydration reactions involving olivine- and pyroxene-rich ores in order to sequester carbon dioxide, liberate hydrogen, generate magnetite and magnesite, and/or derive other desired products, including scarce metals, which are in many cases critical to various green technologies (e.g., batteries, energy storage, photovoltaics) otherwise mined using carbon-intensive methods.

BACKGROUND

The environmental impact of greenhouse gases, primarily carbon dioxide ($CO_2$) and methane ($CH_4$), has been the subject of much public debate over the past several decades. More recently, self-imposed private-sector initiatives and government-mandated regulations to reduce the release of greenhouse gases into the environment have begun to be implemented. In addition to the capture and/or sequestration of carbon dioxide and other greenhouse gases to mitigate their atmospheric release, much research and development effort has been focused on the utilization of alternatives to fossil fuel combustion for energy production in order to reduce the amount of carbon dioxide generated and/or that must be captured and sequestered.

Hydrogen ($H_2$) gas holds promise as an energy source (e.g., as hydrogen fuel or through the use of green ammonia) and chemical feedstock (e.g., methanol, ammonia, hydrocarbon fuels) that provides little-to-no greenhouse gas emission upon combustion. Indeed, the combustion of hydrogen gas yields just water as a reaction product. However, hydrogen gas has traditionally been produced using fossil fuels (e.g., via natural gas/methane conversion in a steam reformer), which yields the greenhouse gas carbon dioxide as a reaction product. For example, in the steam-methane reforming reaction mentioned, methane is reacted with steam (i.e., water) to produce hydrogen gas and carbon monoxide. In a subsequent water-gas shift reaction, the carbon monoxide is further reacted with steam to produce carbon dioxide and additional hydrogen gas. The hydrogen gas is subsequently separated from the carbon dioxide through pressure swing adsorption, membrane separation, or another gas separation process. Thus, most hydrogen that is produced in refinery operations, for example, produces greenhouse gases, which must be captured and sequestered to yield meaningful benefit.

Alternatively, hydrogen gas may be generated by the electrolysis of water into hydrogen gas and oxygen. The hydrogen gas is subsequently separated from oxygen through pressure swing adsorption, membrane separation, or another gas separation process. Hydrogen production via electrolysis, or partial pyrolysis reactions, requires a substantial amount of electricity. While at least some of the required electricity for hydrogen production via electrolysis and/or partial pyrolysis reactions may be obtained from renewable sources (e.g., wind, solar, and hydroelectric), in practice the majority of the electricity used for this purpose has traditionally been, and continues to be, produced through the combustion of fossils fuels, which also produces greenhouse gases.

The abiotic production of hydrogen gas is known to occur in certain geological formations, e.g., at young oceanic crust near a mid-oceanic ridge, as depicted in FIGS. 1A-1D. These natural reactions occur across a range of environmental conditions that include variable pH, oxygen fugacity, chemical composition, and pressure. Such reactions produce variable and complex mineralogy and chemistry but do not predictably produce any specific combination of reaction products. In fact, as generally illustrated in the cross-section photograph of FIG. 2, rock deposits 200 that may yield abiotic hydrogen often contain complex mixtures or layers of difficult-to-extract mineral phases, or will not produce a desired product if other competing reactions are preferred based on in situ geochemical conditions (e.g., variable redox potential (Eh), pH, pore water composition, gas chemical composition, and temperature). For example, hydrogen production is highly variable in nature and its occurrence greatly depends on pH, Eh, and other aspects of fluid geochemistry in pore spaces and at mineral surfaces. Thus, the complex kinetics of reaction phases and the occurrence of competing reactions in natural conditions (e.g., circumneutral pH, variable oxygen fugacity, and variable pore water chemistry) govern the products yielded by these naturally occurring reactions. Certain geological formations and/or the rocks thereof are also known to contain minerals that are conducive to reaction with carbon dioxide under certain conditions to form carbonated mineral phases, e.g., carbonates.

BRIEF SUMMARY

FIG. 3 provides a map that highlights the example locations of selected suitable and/or robust deposits of mafic and ultramafic rock around the world. Olivine- and pyroxene-bearing ores may be found in such mafic and/or ultramafic formations. As can be understood from FIG. 3, sources of mafic and ultramafic igneous rocks may be found in many locations and are quite plentiful, accounting for at least 10% of the continental crust of the Earth, which illustrates the global applicability of solutions described herein. More recently, such sources of mafic and ultramafic igneous rock have garnered interest for their potential exploitation to sequester (mineralize) carbon dioxide in carbonate mineral phases. However, despite significant prior work on carbon sequestration, there is considerable debate about the best mechanistic reactions and optimized rates for carbon mineralization. As such, the economic viability of these processes has not been fully developed, nor has the hydrogen generation and carbon sequestration capacity of mafic and ultramafic rocks been realized. Moreover, no economic use has been identified for the fine-grained carbonated mineral phases that result from carbonization reactions. Rather, proposals have recommended such carbonated mineral phases be used as fill or dumped in oceans or lakes).

Despite the theoretical potential for such geological formations and/or the ores thereof to be exploited for geological hydrogen or other products, and for potential carbon sequestration, the processes and kinetics of these reactions has not been rigorously evaluated nor optimized. Further, processes for the production of hydrogen from these geological formations without the occurrence of alternative, and sometimes deleterious, mineral phases (e.g., serpentine, such as antigorite, asbestos) have not been developed. Accordingly, Applicant has recognized a need for systems and methods that exploit certain geological formations and/or the ores thereof to liberate hydrogen, generate magnetite and magnesite, and/or derive other desired products, such as scarce/critical metals from geological formations that include olivine- and pyroxene-rich ores, and in addition, sequester carbon dioxide in magnesite or other mineral phases.

The disclosure herein provides one or more embodiments of systems and methods for sequestering carbon, evolving hydrogen gas, and producing magnetite as well as magnesite from olivine- and pyroxene-bearing ores. In addition, precious or scarce metals, such as nickel, cobalt, chromium, and rare earth elements, may be concentrated in the remaining ore, which facilitates their recovery.

In an example embodiment, a method is provided for sequestering carbon and producing hydrogen and magnetite. The method includes obtaining an ore that containing olivine or pyroxene. The ore may be comminuted into smaller size fractions, such as by crushing or grinding. The comminuted ore may be introduced into a reactor that is operable at temperatures above ambient temperature and pressures above atmospheric pressure. The method may also include introducing carbon dioxide (or a mixture of carbon dioxide and other gases such as nitrogen ($N_2$), dihydrogen sulfide ($H_2S$), and sulfur dioxide ($SO_2$) into the reactor at a first temperature above ambient temperature for a first residence time to react at least a portion of the carbon dioxide with the ore. The method also includes later introducing water into the reactor at a second temperature for a second residence time to react at least a portion of the water with one or more of the remaining ore to generate at least magnetite and hydrogen gas. Reaction products, including hydrogen gas, magnesium carbonate (magnesite), magnetite, other reaction products, and any remaining ore may be removed from the reactor.

In another embodiment, a method is provided for sequestering carbon and generating hydrogen and magnetite from rock. The method includes obtaining an ore that olivine or pyroxene. As above, the ore may be broken down into smaller size fractions, such as by crushing or grinding. The ore is introduced into a first reactor that is operable at a first temperature above ambient temperature and pressures above atmospheric pressure. The method also includes introducing carbon dioxide (or a mixture of carbon dioxide and other gases such as nitrogen ($N_2$), dihydrogen sulfide ($H_2S$), and sulfur dioxide ($SO_2$)) into the first reactor at the first temperature for a first residence time to react at least a portion of the carbon dioxide with the ore to generate at least magnesium carbonate. The remaining ore may be passed to a second reactor. Reaction products from the first reactor may be separated from the remaining ore or may also be passed to the second reactor. The method also includes introducing water into the second reactor at a second temperature for a second residence time to react at least a portion of the water with the remaining ore in the second reactor to produce at least magnetite and hydrogen gas. Reaction products, including hydrogen gas, magnesium carbonate (magnesite), magnetite, other reaction products and any remaining ore may be removed from the second reactor.

In yet another embodiment, a system is provided for sequestering carbon and producing hydrogen and magnetite from rock. The system includes a source of ore that contains olivine or pyroxene. The system may include a crusher or grinder used to physically reduce the particle size of the ore introduced therein from the source. The system may include a sieve used to receive the ore from the crusher and configured to allow ore particles up to a pre-selected size to pass therethrough. The system also includes a reactor having an inlet that receives ore particles up to the pre-selected size from the sieve and at least one outlet. The reactor also has at least one additional inlet through which one or more of carbon dioxide or water may be introduced (and in some embodiments, the reactor may comprise two reactors: a first reactor having an additional inlet through which carbon dioxide may be introduced, and a second reactor having another additional inlet through which water may be introduced). The reactor is operable at a first temperature for a first residence time to react at least a portion of any received carbon dioxide with the ore in the first reactor to generate at least magnesium carbonate. The reactor is also operable at a second temperature for a second residence time to react at least a portion of any water that enters the reactor through the at least one additional inlet with any ore within the reactor to generate magnetite and hydrogen gas. In one or more embodiments, the system also includes a gas separator that is connected to and in fluid communication with the at least one outlet of the reactor. The gas separator is configured to separate hydrogen gas from gases that exit the reactor through at least one outlet of the reactor.

Corresponding means for performing these various steps are set forth below.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1A:
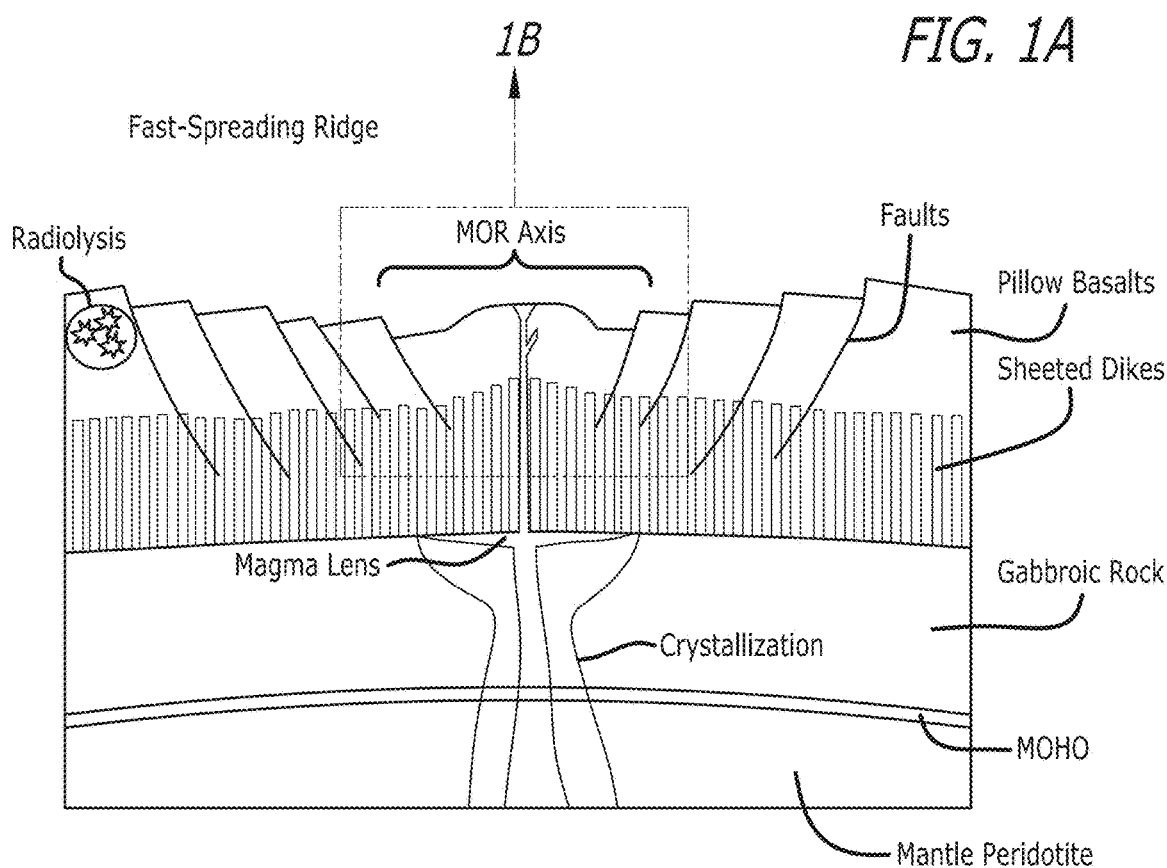
FIGS. 1A, 1B, 1C, and 1D illustrate cross-sectional representations of young oceanic crust and associated structures positioned near a theoretical mid-oceanic ridge that may produce and/or host abiotic hydrogen production.
Figure 1B:
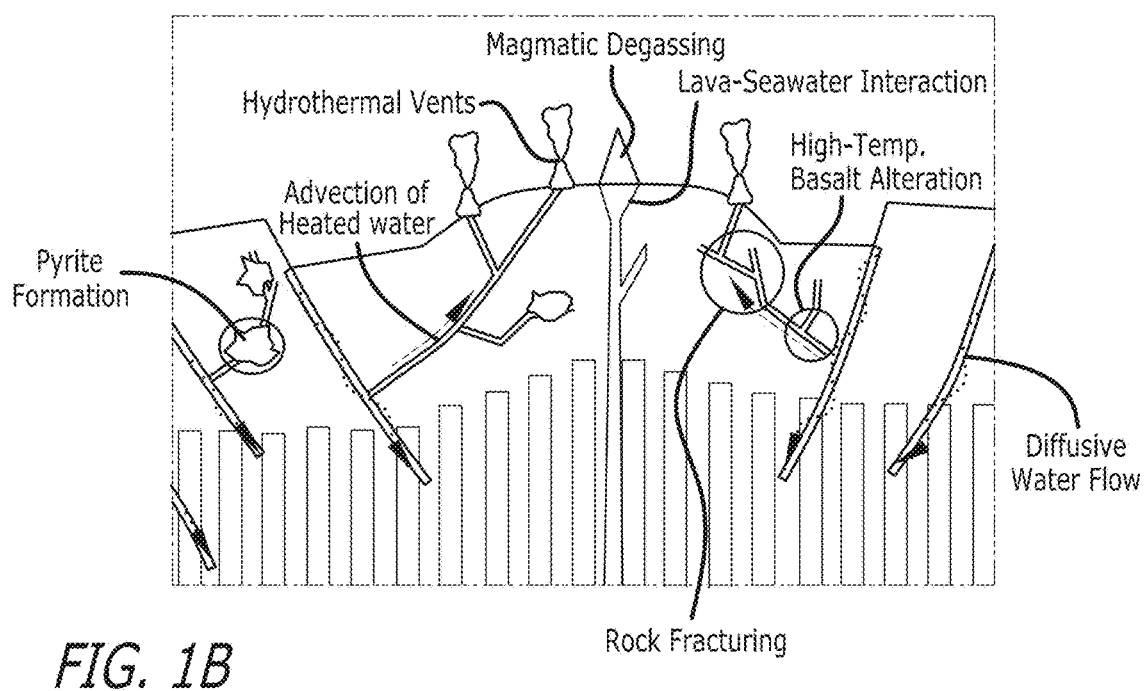
Figure 1C:
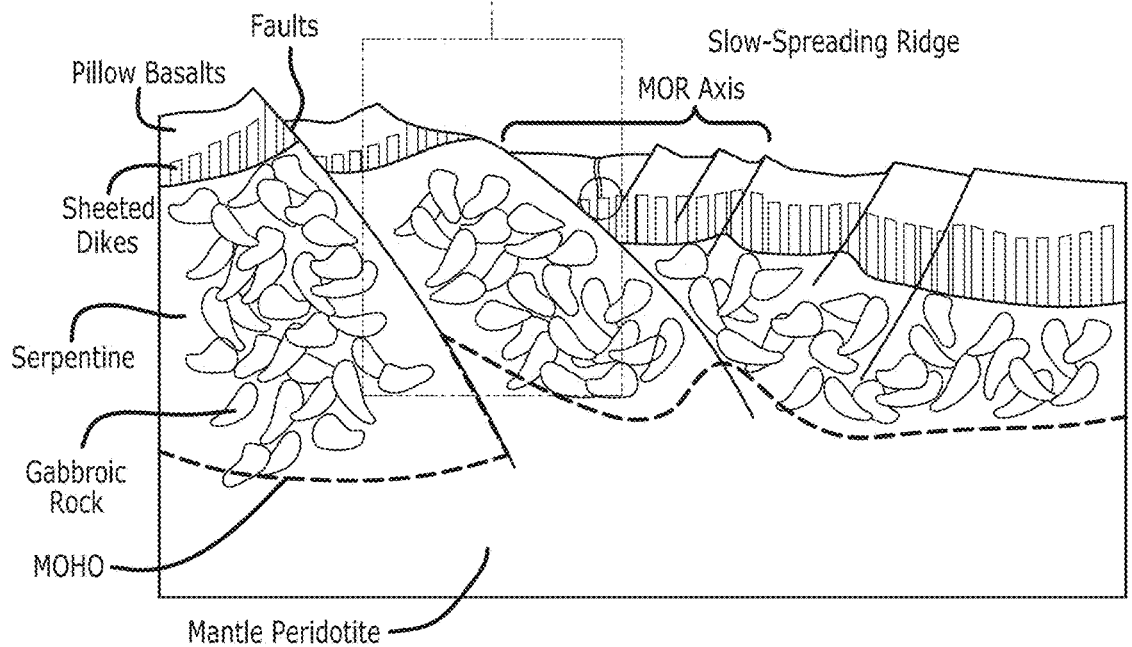
Figure 1D:
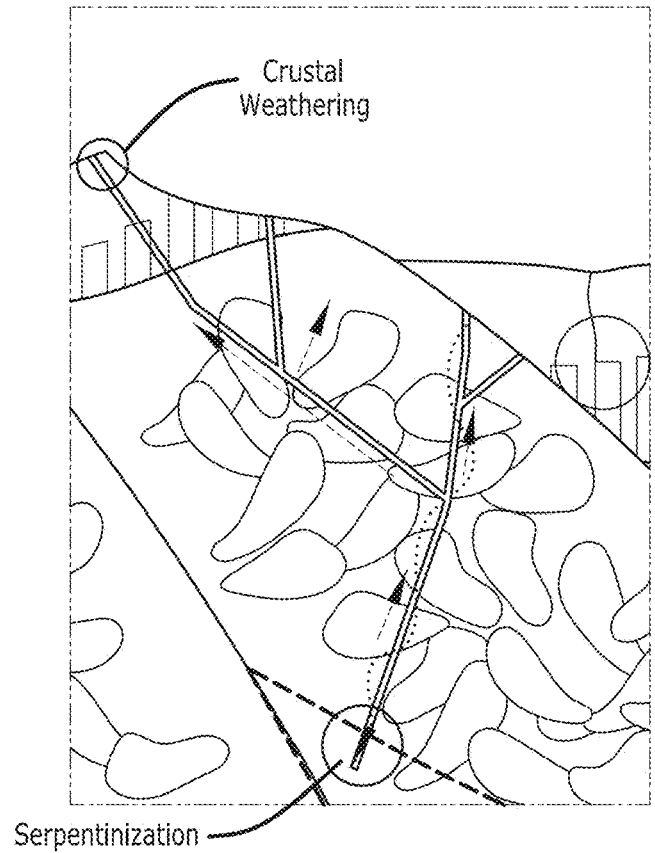
Figure 2:
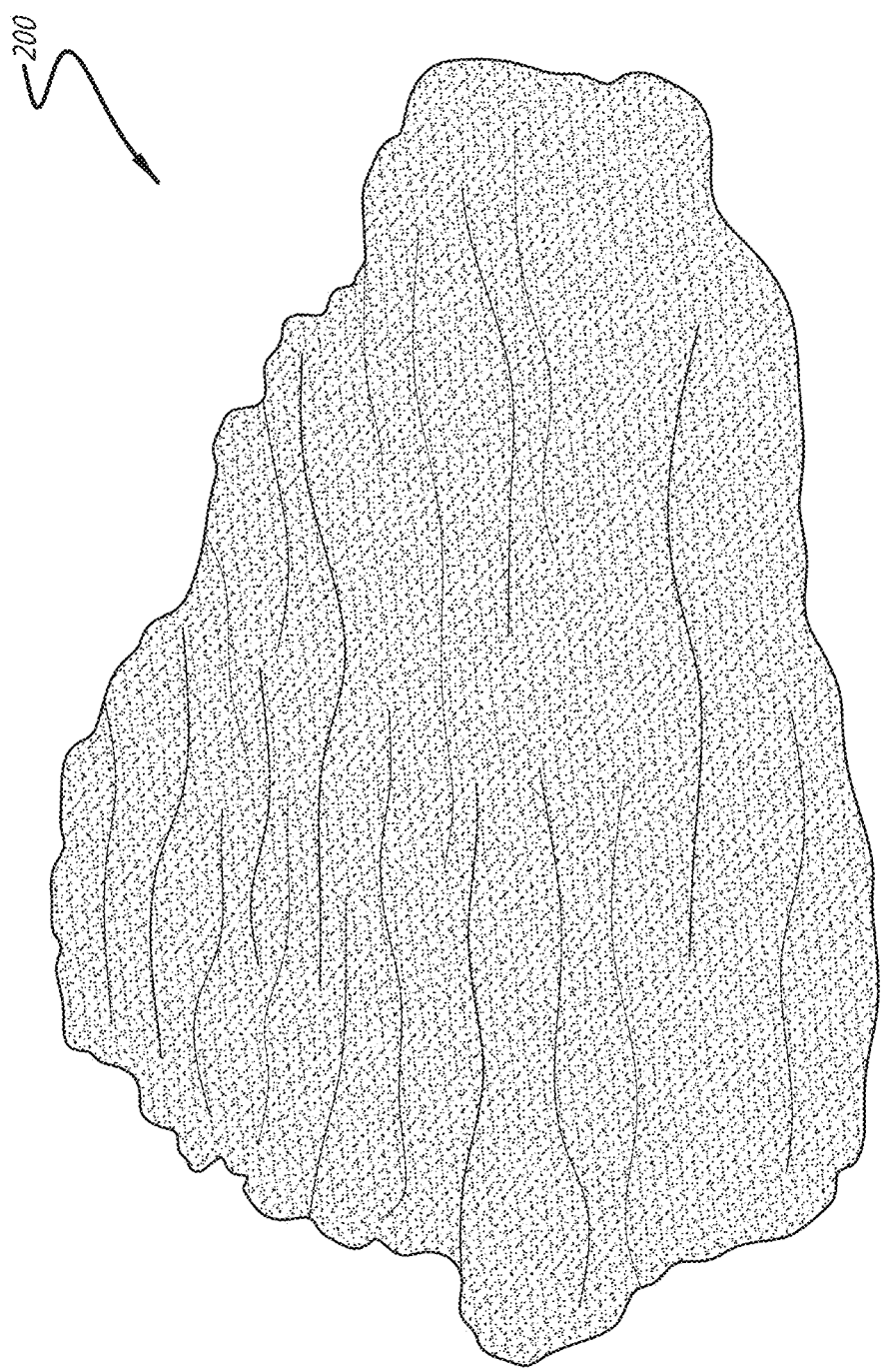
FIG. 2 illustrates an example cross-section of serpentinized ultramafic rock.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Overview

Applicant recognized that despite the significant theoretical potential of mafic and/or ultramafic igneous rocks (or, more broadly, olivine- and pyroxene-bearing ores, such as those with elevated iron content), as described above, to serve as geological sources for economic geological hydrogen, to be exploited as natural sources and catalysts for hydrogen and magnetite production, and to be exploited for carbon sequestration, the optimal processes and kinetics for these reactions have not been rigorously evaluated nor optimized. Specifically, process steps to enhance both carbon sequestration and the production of hydrogen, magnetite, magnesite, and/or other minerals from these types of rocks—without the formation of alternative (and sometimes deleterious, e.g., serpentine, asbestos) mineral phases—have not been developed.

Further, Applicant is unaware of any prior attempts to use an optimized chemical process of carbon mineralization to enhance the kinetics of hydrogen and magnetite production, or to regulate the chemical species of the resulting reaction products (e.g., prevent the formation of serpentine and asbestos).

In various embodiments disclosed herein, carbon dioxide may be sequestered, and hydrogen, magnetite, and other scarce metals may be produced economically (and with a neutral to net-negative carbon footprint) using olivine- and pyroxene-rich ores through sequential carbonation and serpentinization reactions in a controlled environment. Thus, Applicant has developed an engineering process that employs sequential reactions to exploit the potential for olivine- and pyroxene-rich ores to both sequester carbon dioxide dominantly as magnesite or other carbonate minerals, as well as liberate hydrogen, magnetite, and/or other desirable minerals/scarce metals. Applicant further recognized that additional process steps applied to the olivine- and pyroxene-rich ores may enhance the concentration and recovery of precious or scarce metals (e.g., nickel, cobalt, chromium, lithium, and rare earth elements.), which are needed for renewable energy and energy storage, among other uses.

Applicant discovered that the serpentinization reaction process can be advantaged such that the chemical activity and commensurate rates of reactions between water and fayalite and/or ferrosilite may be enhanced by first removing a significant component of forsterite from the olivine mineral phase and increasing the comminution of mineral grains by inducing the described chemical reactions. In this way, the fayalite and/or ferrosilite in the igneous rock is concentrated and/or becomes less obscured by adjacent minerals, e.g., forsterite. This process benefits the reaction in two ways: first, by enhancing the surface area of fayalite and/or ferrosilite exposed for the reaction; and second, by pre-concentrating the reactant (iron-rich olivine (fayalite) or pyroxene (ferrosilite)) of choice. Thus, in one or more embodiments, forsterite and/or enstatite are at least partially removed prior to reacting the fayalite and/or ferrosilite with water.

Some primary differentiators that demonstrate the value of example ex situ engineered embodiments that produce hydrogen, magnesite, magnetite, and critical metals via this pathway include: 1) the immense geological scalability of such embodiments once the "serpentinization" processes are optimized to produce the desired products (hydrogen, magnetite, scarce metals), as opposed to alternative mineral phases such as serpentine, asbestos, etc.; 2) the potential to permanently and verifiably sequester $CO_2$ in a mineralized form and hence produce hydrogen, magnetite, and scarce metals in a carbon-negative process; and 3) the price point of potentially scalable "green" or "golden" hydrogen (i.e., carbon negative hydrogen), magnetite, and scarce metals, which can be greatly offset by considering other values streams generated using the quarrying concept (i.e., the sale of aggregate or higher value utilization of magnesite).

Although a high-level explanation of the operations of example embodiments has been provided above, specific details regarding the configuration of such example embodiments are provided below.

Serpentinization and Carbonation Reactions

The disclosure herein provides one or more embodiments of systems and methods that facilitate the production of hydrogen, magnetite, and/or other desired minerals through serpentinization reactions involving olivine- and pyroxene-rich ores generally found in mafic and/or ultramafic igneous rock, or of any other rock assemblages containing such olivine- and pyroxene-rich ores. Table 1, provided below, gives representative serpentinization reactions involving fayalite ($Fe_2SiO_4$) and/or ferrosilite ($Fe_2Si_2O_6$). Fayalite is a mineral phase that is the iron-rich endmember of the olivine solid solution series and is abundant in olivine-rich orc. Ferrosilite is the iron-rich endmember of the orthopyroxene solid solution series and is associated with pyroxene-rich ore. Fayalite and ferrosilite are commonly found together in mafic and ultramafic igneous rocks. Under certain conditions, water reacts with fayalite and ferrosilite to generate magnetite ($Fe_3O_4$), silica ($SiO_2$), and hydrogen gas ($H_2$) in the appropriate stoichiometric ratios. In each case, two moles of hydrogen gas are produced from three moles of either fayalite or ferrosilite mineral.

TABLE 1

Hydrogen-Generating Serpentinization Reactions
Serpentinization Reactions

| Mineral | Mineral Phase | Serpentinization Reaction | Moles of Igneous Mineral | Moles of $H_2$ |
|---|---|---|---|---|
| Olivine | Fayalite | $3\ Fe_2 + 2\ H_2O \rightarrow 2\ Fe_3O_4 + 3\ SiO_2 + 2\ H_2$ | 3 | 2 |
| Pyroxene | Ferrosilite | $3\ Fe_2Si_2O_6 + 2\ H_2O \rightarrow 2\ Fe_3O_4 + 6\ SiO_2 + 2\ H_2$ | 3 | 2 |

In one or more embodiments, the disclosed systems and methods may also facilitate the sequestration of gaseous carbon dioxide as mineralized carbonates through carbonation reactions involving the magnesium-rich endmember of olivine- and pyroxene-rich ores found typically in mafic and/or ultramafic rock. Table 2, provided below, gives representative carbonation reactions involving forsterite ($Mg_2SiO_4$) and enstatite ($Mg_2Si_2O_6$), as well as illustrating the potential for carbonation during reaction with antigorite ($Mg_3Si_2O_5(OH)_4$) that can be formed as an accessory mineral phase in natural systems in which fluid conditions are not idealized for the formation of magnesite. Forsterite is a mineral phase that is the magnesium-rich endmember of the olivine solid solution series associated with olivine-rich ore. Enstatite is a mineral phase that is the magnesium-rich endmember of the orthopyroxene solid solution series associated with pyroxene-rich ore. Antigorite is an example mineral phase that is associated with serpentine. Under certain conditions, carbon dioxide reacts with forsterite and enstatite, and/or other accessory mineral phases (e.g., antigorite) to generate at least magnesium carbonate ($MgCO_3$) and silica ($SiO_2$) in appropriate stoichiometric ratios. The reaction of antigorite with carbon dioxide further yields a stoichiometric quantity of water and is shown to illustrate serpentinization reactions that occur in natural systems in which pH, Eh, temperature, pressure, and fluid chemistry cannot be optimized. In the case of the idealized carbonization reaction involving forsterite and enstatite, two moles of carbon dioxide gas are converted to magnesium carbonate (magnesite) per mole of either forsterite or enstatite mineral.

TABLE 2

Carbon-Sequestering Carbonation Reactions
Decarbonation Reactions

| Mineral | Mineral Phase | Decarbonation Reaction | Moles of Igneous Mineral | Moles of $CO_2$ |
|---|---|---|---|---|
| Olivine | Forsterite | $Mg_2SiO_4 + 2\ CO_2 \rightarrow 2\ MgCO_3 + SiO_2$ | 1 | 2 |
| Pyroxene | Enstatite | $Mg_2Si_2O_6 + 2\ CO_2 \rightarrow 2\ MgCO_3 + 2\ SiO_2$ | 1 | 2 |
| Serpentine | Antigorite | $Mg_3Si_2O_5(OH)_4 + 3\ CO_2 \rightarrow 3\ MgCO_3 + 2\ SiO_2 + 2\ H_2O$ | 1 | 3 |

In nature, and as previously described, the above-described serpentinization and carbonization reactions occur, but only as a subset of a variety of reactions occurring across a range of environmental conditions in the subsurface or at surface conditions of the earth. As a result, the environmental conditions are often variable and reactions kinetics and pathways are far from ideal. Accordingly, natural reactions are based on the variable (and often dynamic, i.e., changing with time) pH, oxygen fugacity, temperature, pore water chemical composition, gas chemical composition, and pressure found in nature, specifically in the subsurface. The multitude of reactions and potential pathways for those reactions occurring in nature lead to the formation of variable and complex chemistry and assemblages of minerals, but do not predictably produce any specific combination of usable reaction products. Instead, natural systems, which evolve through time and under varying reaction conditions produce complex (and often heterogeneous) complexes of varying mineral assemblages and products of reactions that did not follow the idealized reactions described above, or are slower to reach thermodynamic equilibrium.

With respect to olivine and pyroxene mineralogy and chemistry, olivine is a solid solution series ($X_2SiO_4$, where $X=Mg^{2+}$ or $Fe^{2+}$) between a magnesium silicate (forsterite) and an iron silicate (fayalite) and pyroxene (i.e., orthopyroxene) is a solid solution series ($X_2Si_2O_6$, where $X=Mg^{2+}$ or $Fe^{2+}$) between a magnesium silicate (enstatite) and an iron silicate (ferrosilite). In the olivine-rich deposits of interest, fayalite and ferrosilite are usually the minor constituent and typically range in concentration from 6% to 20%, with the lower range concentrations appearing more commonly in nature. Consequently, the thermochemical activities of fayalite and ferrosilite are relatively low compared to those of the forsterite or enstatite, respectively. Thus, if the olivine or pyroxene obtained from a quarry is crushed and reacted with water at favorable reaction conditions (i.e., controlled for temperatures, pressures, Eh, pH, and fluid composition, then a serpentinization reaction will proceed at a relatively low rate due to relatively low thermochemical activity and commensurately low rates of reactions with fayalite or ferrosilite. Nevertheless, when completed, the reaction produces magnetite, silica, and hydrogen (from the reaction of fayalite or ferrosilite with water) may be separated (magnetically or gravimetrically) from forsterite, enstatite, or magnesite. The mixture of olivine (forsterite and fayalite) and pyroxene (enstatite and ferrosilite) minerals, however, constitutes an almost an "ideal" mixture that is exceedingly rare in natural systems. However, in an ideal mixture, the chemical activity varies linearly with the mole fraction and is roughly equal to the mole fraction. Thus, the chemical activity and reaction rate can be enhanced by pre-concentrating the abundance of olivine and pyroxene from the bulk ore and specifically the abundance of the iron-rich endmembers of both the olivine and pyroxene solid solution series.

Ex Situ Sequestration of Carbon Dioxide and
Generation of Hydrogen

In various embodiments contemplated herein, carbon dioxide may be mineralized, and hydrogen, magnesite, magnetite, and critical metals may be produced economically (and with an overall neutral to net-negative carbon footprint) by an engineered system that causes sequential reactions in the manner shown in the flow diagrams illustrated in FIGS. 4A, 4B, and described in connection with the flowcharts provided in FIGS. 5, 6, and 7.

Figure 4A:
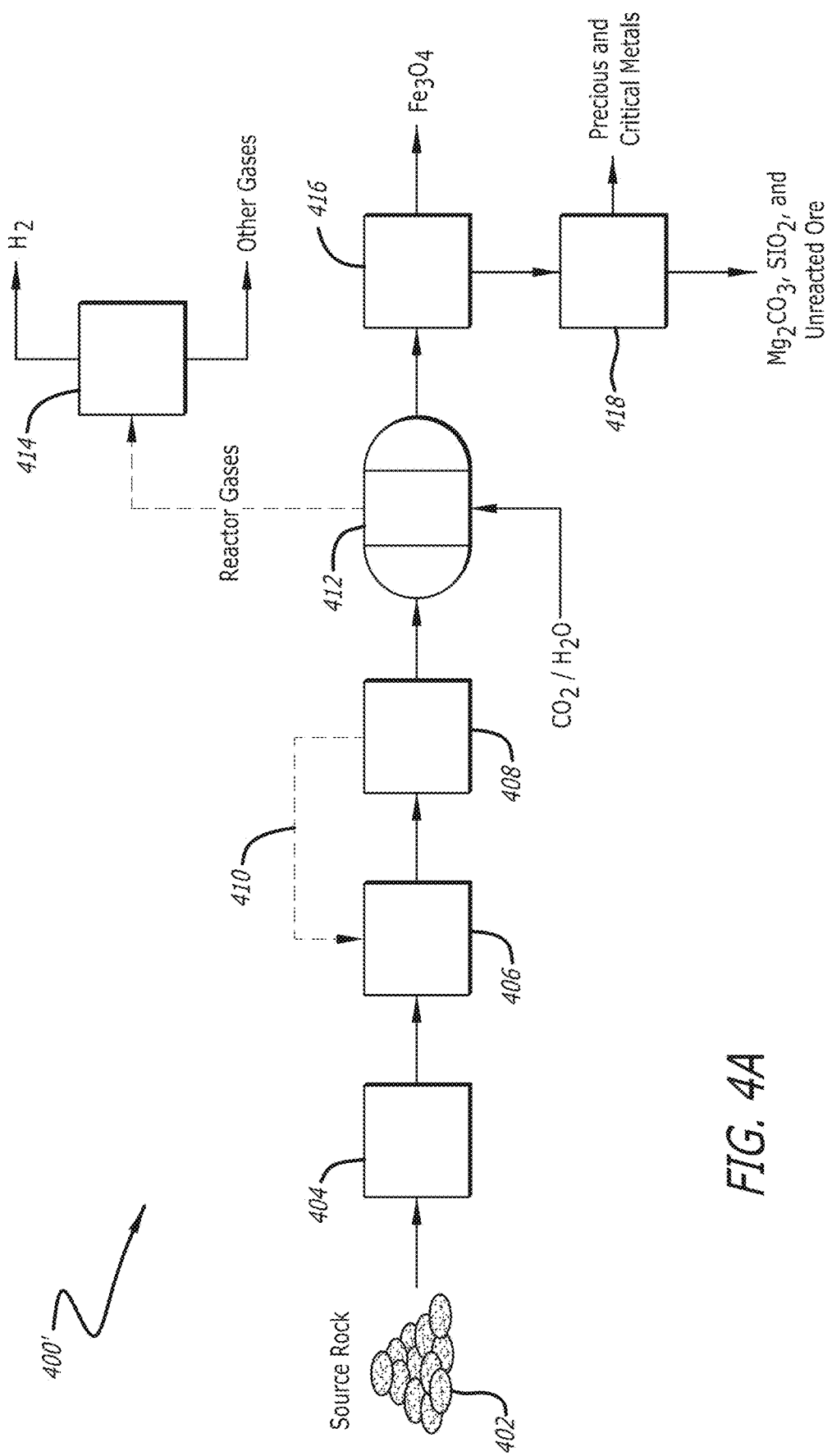
FIG. 4A provides an example flow diagram illustrating a sequence of operations performed by a system to enhance carbon dioxide sequestration, hydrogen gas evolution, and magnetite and magnesite production using a single reactor, in accordance with some example embodiments described herein.

FIG. 4A illustrates a flow diagram of one embodiment 400' of a system for enhancing the production of hydrogen gas and magnetite from rock that contains a mixture of olivine (e.g., fayalite and forsterite) and pyroxene (e.g., ferrosilite and enstatite) minerals. A source of olivine- and/or pyroxene-rich ores 402 may be fed or introduced into a crusher or grinder 406 that reduces the size of the received ore into smaller size fractions. In one or more embodiments, a washer 404 may optionally be used to wash the ore with water or a mildly acidic solution to remove any contaminants therefrom and prepare the ore for carbonation reactions. The crushed or ground rock is then introduced into a sieve 408 or other such separator that segregates the rock into pre-selected particle ranges. In one or more embodiments, the sieves or grates thereof are sized to pass 150-, 80-, and even 45-micron grains, although different sizing can be utilized. In at least one embodiment, the comminuted rock is a powder or has a powder-like particle size range. Rock that does not pass through the sieve may be returned to the crusher or grinder 406 via a recycle loop 410 to be reduced further in size. The subset of the rock having particles within a pre-selected particle range of the sieve 408, e.g., 150-micron, 80-micron, 45-micron, or any size therebetween, is then fed or introduced into a reactor 412.

The reactor 412 may be a rotary kiln, a toroidal fluidized bed, a fluidized bed, or another reactor known to those skilled in the art. The reactor 412 may have an inlet that receives ore (or ore particles) at least one outlet, from which any remaining ore may be removed following reaction within the reactor 412. The reactor 412 may further have at least one additional inlet through which one or more of carbon dioxide or water can be introduced into the reactor 412. The reactor 412 may be operable at a first temperature for a first residence time to react carbon dioxide that enters the reactor 412 through the at least one additional inlet with ore disposed within the reactor 412 to generate magnesium carbonate. The reactor 412 may further be operable at a second temperature for a second residence time to react water that enters the reactor through the at least one additional inlet (which may be the same inlet by which carbon dioxide enters the reactor 412 or a different inlet) with ore disposed within the reactor 412 to generate magnetite and hydrogen gas.

In a first reaction step, carbon dioxide is introduced into reactor 412 with the crushed/ground rock. Water (approximately 10 liters of water per kilogram) may be applied (sprayed or washed) to the crushed/ground rock by washer 404 either before or after placement of the rock into the reactor 412. The wetting of the powdered rock with water allows for the dissolution of gaseous $CO_2$ to carbonic acid ($H_2CO_3$) on the wet surfaces of the mineral grains, which enhances the reactivity of the carbon dioxide with the forsterite mineral found therein. In at least one embodiment, the pH of the water applied to the comminuted rock may be between about 4.8 to about 6.5. Water in this pre-selected pH range further enhances the reaction between the carbon dioxide and the forsterite mineral. During this first reaction step, the reactor is operated at a pre-selected temperature (>90° C.) and pressure (greater than approximately five bars) to facilitate the carbonation reaction with respect to the forsterite mineral found in the rock. In one or more embodiments, the reactor 412 is operated at a temperature of between about 100° C. to about 400° C. and at a pressure of between about five and up to at least 100 bars (e.g., about 40, 50, 75 or even 100 bars); note the upper limit of pressure can be extended to considerably higher pressures if the reactor 412 and associated components are able to withstand such pressures. Increasing pressure in this fashion will produce a corresponding enhancement of the carbonation reaction being prompted at this stage of the process. In other embodiments, the operating pressure of the reactor 412 may be as low as 35 bars, as low as 30 bars, as low as 25 bars, as low as 20 bars, as low as 15 bars, as low as 10 bars, as low as 5 bars, or even lower (~1 bar), and may still prompt the intended carbonation reactions, albeit at commensurately lower rates of reaction. As provided in Table 2 above, the reaction of carbon dioxide with the forsterite ($Mg_2SiO_4$) produces magnesium carbonate ($MgCO_3$) and silicon dioxide ($SiO_2$) as reaction products. In this way, the forsterite mineral of the mafic and/or ultramafic rock is used to permanently sequester $CO_2$ in the form of an insoluble magnesium carbonate mineral lattice, which is a solid that that can be useful as a raw material, placed in a landfill, ocean, lake, or otherwise easily stored. By reacting the crushed/ground rock containing the forsterite with carbon dioxide at favorable conditions of temperature, pressure, Eh, and pH, the forsterite can be altered to magnesite following reaction with carbon dioxide.

It will be understood that, although this first reaction step favorably enhances the comminution of source rock and better prepares any remaining rock for the second reaction step described below, some embodiments may not perform this first reaction step, and instead may simply comminute the source rock, which itself prepares the source rock for the second reaction step, as illustrated by way of example in the Example Implementation section below. Of course, in other embodiments, the source rock may not need to undergo an initial comminution step, but may instead simply be initially processed using the first reaction step described herein, which itself fosters comminution of the source rock and thus prepares it for more effective reaction in the second reaction step described below. Both comminution of the source rock and the carbonation reactions occurring during the first reaction step favorably dispose any remaining rock for the section reaction step below; accordingly, various combination of comminution and the first reaction step may be employed in various scenarios based on the desired results of a given implementation.

In a second reaction step, water is thereafter introduced into reactor 412 with the crushed/ground rock, which may in some embodiments still contain the magnesium carbonate and silicon dioxide from the first reaction step, the fayalite and/or ferrosilite minerals in the original crushed/ground rock, and any other minerals/ores found in the original crushed/ground rock. In some embodiments, magnesium carbonate and silicon dioxide from the first reaction step can be separated from the residual iron silicate phases based on their respective densities. In one or more embodiments of these processes, the water that is added to the reactor 412 may have a low oxygen fugacity (e.g., it may be obtained from municipal wastewater treatment, groundwater, geothermal water, mine waters, another industrial water source, or by reacting a municipal water (i.e., "tap water") over a bed of copper at temperatures exceeding 125° C., or by another mechanism) and a pH of between about 8.3 and about 11.1 (with the specified pH being artificially attained, such as by adding sodium bicarbonate to the water, or naturally obtained, such as where the water with such pH range may be found in certain sources of water and wastewater). During this second reaction step, the reactor is operated at a pre-selected temperature and pressure (~1 to 20 bars) to facilitate the serpentinization of the fayalite and/or ferrosilite minerals in the rock. In one or more embodiments, the reactor 412 is operated at a temperature in the range of between about 80° C. and about 400° C. As provided in Table 1 above, the reaction of water with the fayalite ($Fe_2SiO_4$) and/or ferrosilite ($Fe_2Si_2O_6$) produces hydrogen gas, variable mixtures of nitrogen ($N_2$), carbon dioxide ($CO_2$), silicon dioxide, and magnetite ($Fe_3O_4$) as reaction products. The molecular and isotopic composition of hydrogen formed during this ex situ process will be determined by the temperature conditions of the reaction (e.g., ~175° C.) and the composition of the initial water, wherein the fractionation factors (a) between $H_2O$ and $H_2$ follow the fractionation factors observed for standard geothermometers. The hydrogen gas, along with any other gases in the reactor 412, such as unreacted carbon dioxide ($CO_2$), sulfur dioxide ($SO_2$), or dihydrogen sulfide ($H_2S$) or inert gases (e.g., nitrogen ($N_2$), argon (Ar) from the first reaction step, are passed to a gas separator 414. The gas separator 414 may be a membrane unit, a pressure swing adsorption, or a cryogenic separation unit that can separate the hydrogen gas from other gases, e.g., atmospheric gases, that may also be present in the reactor 412. The gas separator 414 may be connected to and in fluid communication with at least one outlet of the reactor 412 and configured to separate hydrogen gas from gases that exit the reactor 412 through the at least one outlet.

In at least one embodiment, gases that may be present in the reactor 412 prior to the second reaction may be evacuated prior to the second reaction, such as by pulling a vacuum on the reactor 412. Without these contaminant gases in the reactor 412 (e.g., $N_2$ or $CO_2$), the hydrogen gas that is formed as a result of the serpentinization reaction with water may be the only gas present after the second reaction step. In such case, the gas separator 414 may not be needed to segregate the hydrogen gas as a product. After the second reaction step, the magnesium carbonate, silicon dioxide, magnetite, and any remaining rock/unreacted ore may be removed from the reactor 412. In some embodiments, magnesium carbonate (i.e., magnesite) and silicon dioxide (i.e., quartz) may be separated from iron silicates and other mineral phases before the material is placed in reactor 412. The magnetite, which represents a valuable product/feedstock for the iron industry (with particular value in direct reduced iron manufacturing), may be recovered from the magnesium carbonate, silicon dioxide and any remaining rock/ore by, for example, magnetic separation or other density separation techniques. A magnetic separator 416 may be used to selectively attract the magnetite through the use of one or more magnets and thereby physically remove the magnetite from the other non-metallic ore. In one or more embodiments, the solid products, e.g., the magnetite, magnesium carbonate, silicon dioxide, and any remaining, unreacted ore/rock may be further crushed or ground (not shown in FIG. 4A) to facilitate the removal of magnetite particles from the other solids in the magnetic separator 416 or conduct secondary recovery of other minerals or metal-rich phases. The separated hydrogen gas from gas separator 414 and the magnetite recovered via the magnetic separator 416 are valuable products whose production and recovery from mafic and/or ultramafic rock are enhanced by the disclosed sequential carbonization and serpentinization reactions disclosed herein.

The remaining magnesium carbonate (in which the carbon is permanently sequestered in the mineral phase), silicon dioxide, and any unreacted rock/ore may be used as an aggregate material and/or placed in landfill or otherwise disposed of. In one or more embodiments, the magnesium carbonate and silicon dioxide may be separated (based on density separation techniques such as heavy liquids or other gravity separation, or sluicing) and removed from the remaining rock/gangue (gangue: collection of accessory mineral phases such as phosphates, sulfides, aluminum oxides, etc.) materials. As further discussed below, magnesium carbonate (or magnesite) is useful in the manufacturing of pharmaceuticals, agricultural lime, and fertilizers (to neutralize acidification caused by fertilizer use), ceramics and ceramic brick, and as flux used in iron and steel manufacturing. Magnesite may also be used as a partial lime substitute to enable lower carbon emissions that result from the lower temperatures required to make magnesium oxide (MgO) as compared to calcium oxide (CaO) for cement manufacturing. Further, magnesite can be used as a carbon negative concrete filler and cement or aggregate substitute in concrete.

In one or more embodiments, rather than landfilling or otherwise using the bulk of the magnesium carbonate, silicon dioxide, and any unreacted rock/ore, the rock and/or gangue material from the first reaction phase is further processed to separate and remove specific valuable components therefrom. For example, elevated concentrations of certain precious metals (e.g., nickel, cobalt, chromium, and rare earth elements) in mafic and ultramafic rocks are further concentrated in this "slag" material. In at least one embodiment, highly elevated metal enrichments, that include but are not limited to phosphates, aluminum oxides, precious metals, and other mineral gangue may be separated from the remaining rock/ore by, for instance, heavy liquid separation or other gravity separation, or sluicing in a separator 418. Through gravity separation, the various metals and other valuable components are ground into fine particles and separated based on their individual specific weights.

As illustrated in FIG. 4A, the first and second reactions can both occur in the same reactor 412, which may be a rotary kiln, fluidized bed, toroidal bed, or other reactor as described previously, in which case the reactions may be run sequentially, and all products separated at the completion of both reactions. In one or more embodiments (not shown in FIG. 4A), the reaction products (i.e., magnesium carbonate and silicon dioxide) may be separated after the first reaction step and prior to the second reaction step using established density separation techniques such as heavy liquid separation or other gravity separation, or sluicing. In other embodiments, as shown in FIG. 4A, the reaction products remain in the reactor during the second reaction step. Even if the reaction products are not physically separated, the thermochemical activity and reaction rates of fayalite and/or ferrosilite will increase according to the newly exposed surface area of fayalite and/or ferrosilite minerals. In other words, the reactivity of the serpentinization reactions with respect to the fayalite and/or ferrosilite minerals will proceed according to the now higher molar fraction of fayalite and/or ferrosilite in the solid solution (i.e., the number and/or extent of alternative side reactions has been reduced). With respect to the upper limit of the fully separated (e.g., using established density separation techniques such as heavy liquid separation or other gravity separation, or sluicing) or exposed fayalite and/or ferrosilite, the thermochemical activity of the powdered material should approach unity of the pure phase mineral, or mixtures of fayalite and/or ferrosilite mineral phases. Thus, the first reaction step involving the reaction of the forsterite with carbon dioxide increases the thermochemical driver for the second reaction step, which is the serpentinization/hydration reaction of the fayalite and/or ferrosilite with water, by reducing the availability of forsterite and increasing the exposed surface area of fayalite and/or ferrosilite minerals. The former increases the kinetic rate by driving the thermochemical activity toward that of a pure compound, while the latter enhances chemical activity by increasing the surface area available for reaction.

Figure 4B:
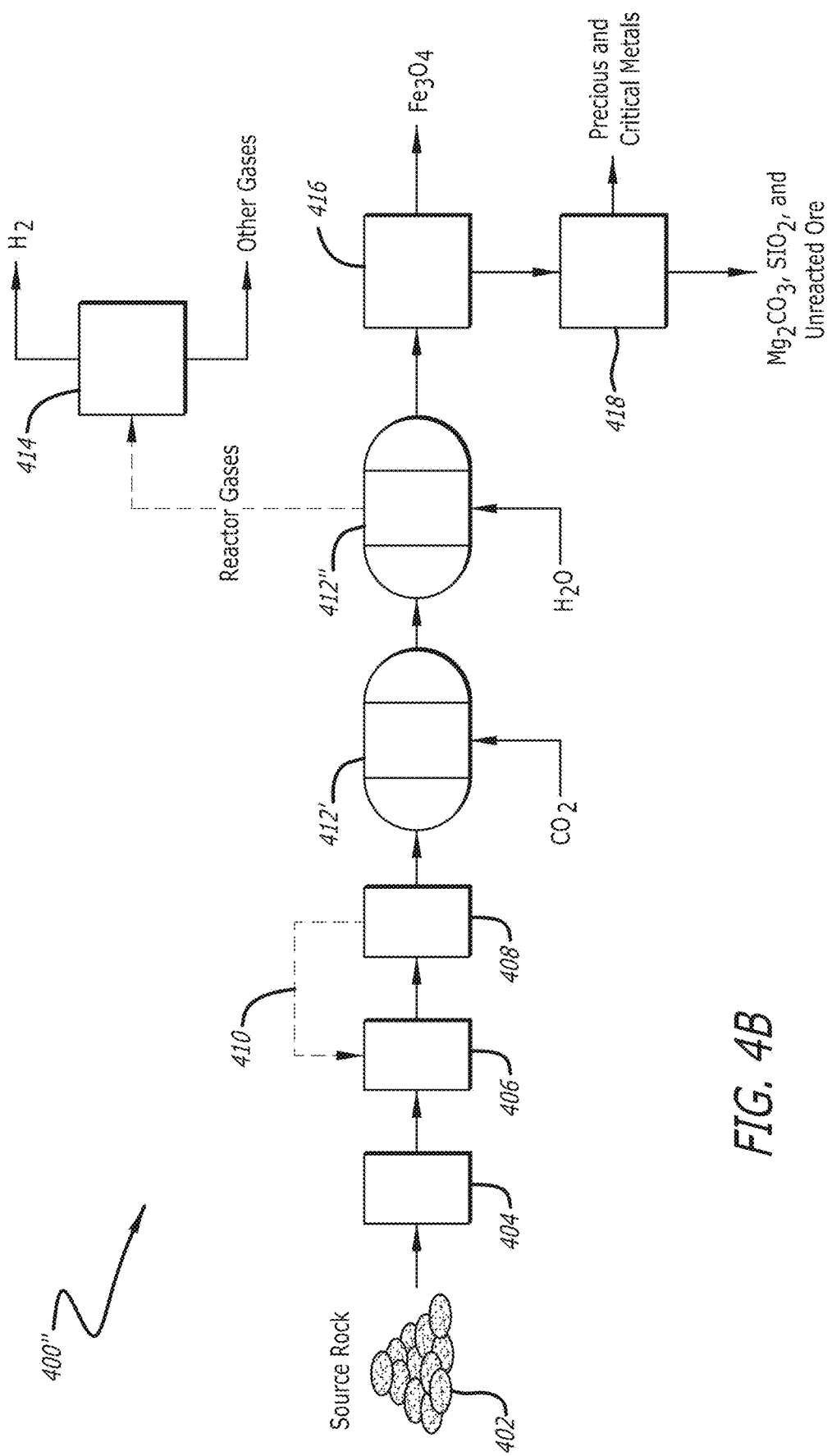
FIG. 4B provides an example flow diagram illustrating a sequence of operations performed by a system to enhance carbon dioxide sequestration, hydrogen gas evolution, and magnetite/magnesite production using multiple reactors, in accordance with some example embodiments described herein.

FIG. 4B illustrates a flow diagram of another embodiment 400" of a system of enhancing the production of hydrogen gas and magnetite from a source rock that contains a mixture including olivine (fayalite and forsterite) and/or pyroxene (ferrosilite and enstatite) minerals. The flow diagram of FIG. 4B is similar to that of FIG. 4A, except that the first reaction step occurs in a first reactor 412' and the second reaction step occurs in a second reactor 412". The first reactor 412' facilities the carbonation reaction between the forsterite mineral and carbon dioxide. The crushed/ground ore of a uniform or pre-selected particle size range is passed from the sieve 408 or other particle size separator into the first reactor 412'. Carbon dioxide is pumped into the first reactor 412' in above stoichiometric ratios to facilitate the carbonization reactions listed in Table 2. After the first reaction has occurred, the magnesium carbonate and silicon dioxide products, along with the unreacted fayalite and/or ferrosilite, and other remaining ore, are passed to the second reactor 412".

Continuing with FIG. 4B, the second reactor 412" facilitates the serpentinization reaction between the fayalite and/or ferrosilite mineral phases and water (or steam). The reaction products and remaining rock/ore from the first reactor 412' are introduced into the second reactor 412". Water is pumped into the second reactor 412" in above stoichiometric ratios (>~20 liters/kg of rock) to facilitate the serpentinization reactions listed in Table 1. After the second reaction has occurred, the reactor gases, including the hydrogen gas evolved during the second reaction step, are passed or routed to a gas separator 414, as described above with respect to FIG. 4A. Likewise, the solid reaction products, including magnesium carbonate, silicon dioxide, magnetite, as well as any unreacted ore/rock are passed to a magnetic separator 416, as described above with respect to FIG. 4B. Other than the use of two reactors 412' and 412" in place of one reactor 412, as described above, the embodiments represented by FIGS. 4A and 4B are similar. It should be noted that the configuration of the system of FIG. 4B provides a semi-continuous method in that the separate process vessels, e.g., reactors 412' and 412", are dedicated to differing portions of the method.

Figure 3:
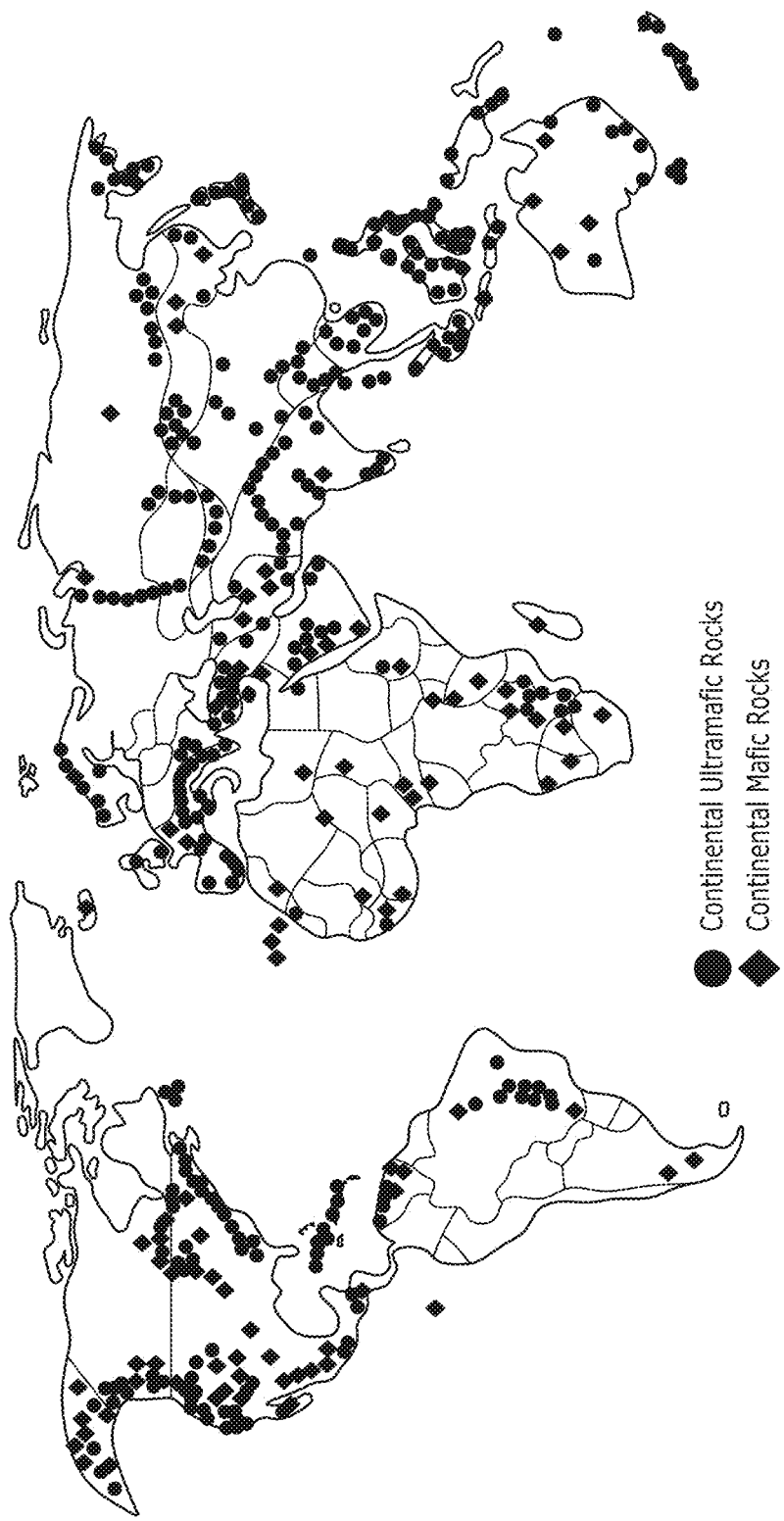
FIG. 3 illustrates a map with locations of suitable olivine- and pyroxene-bearing localities throughout the world.
Figure 5:
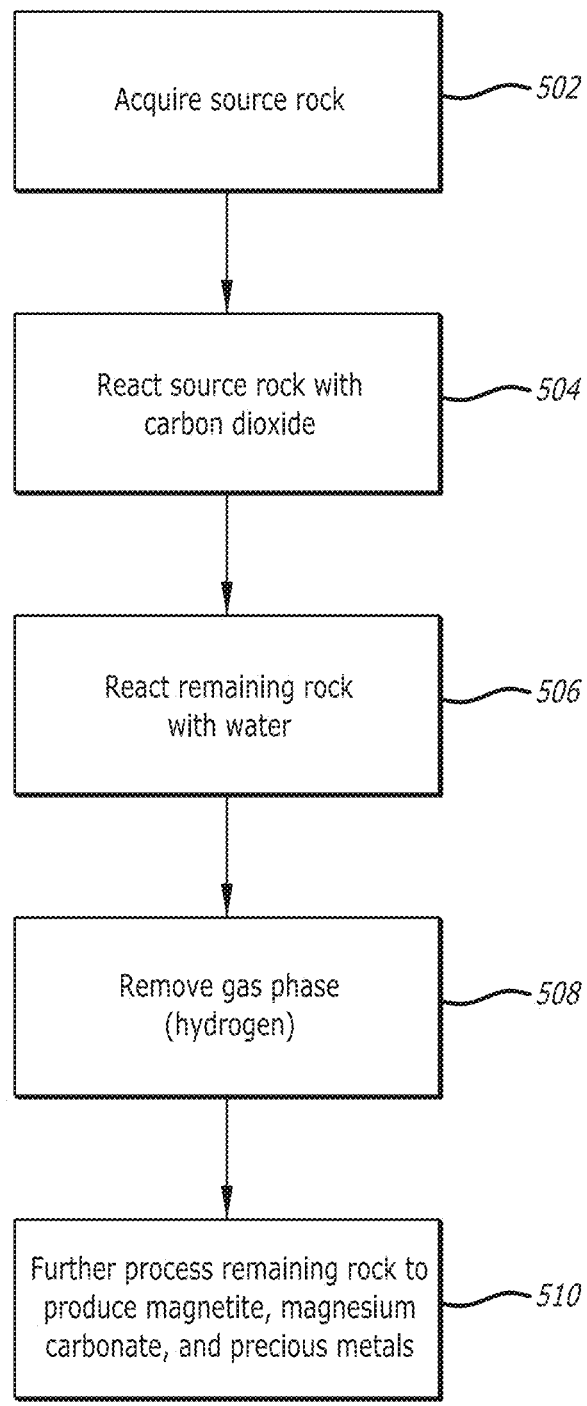
FIG. 5 illustrates an example flowchart for enhancing carbon dioxide sequestration, hydrogen gas evolution, and magnetite/magnesite production, in accordance with some example embodiments described herein.
Figure 6:
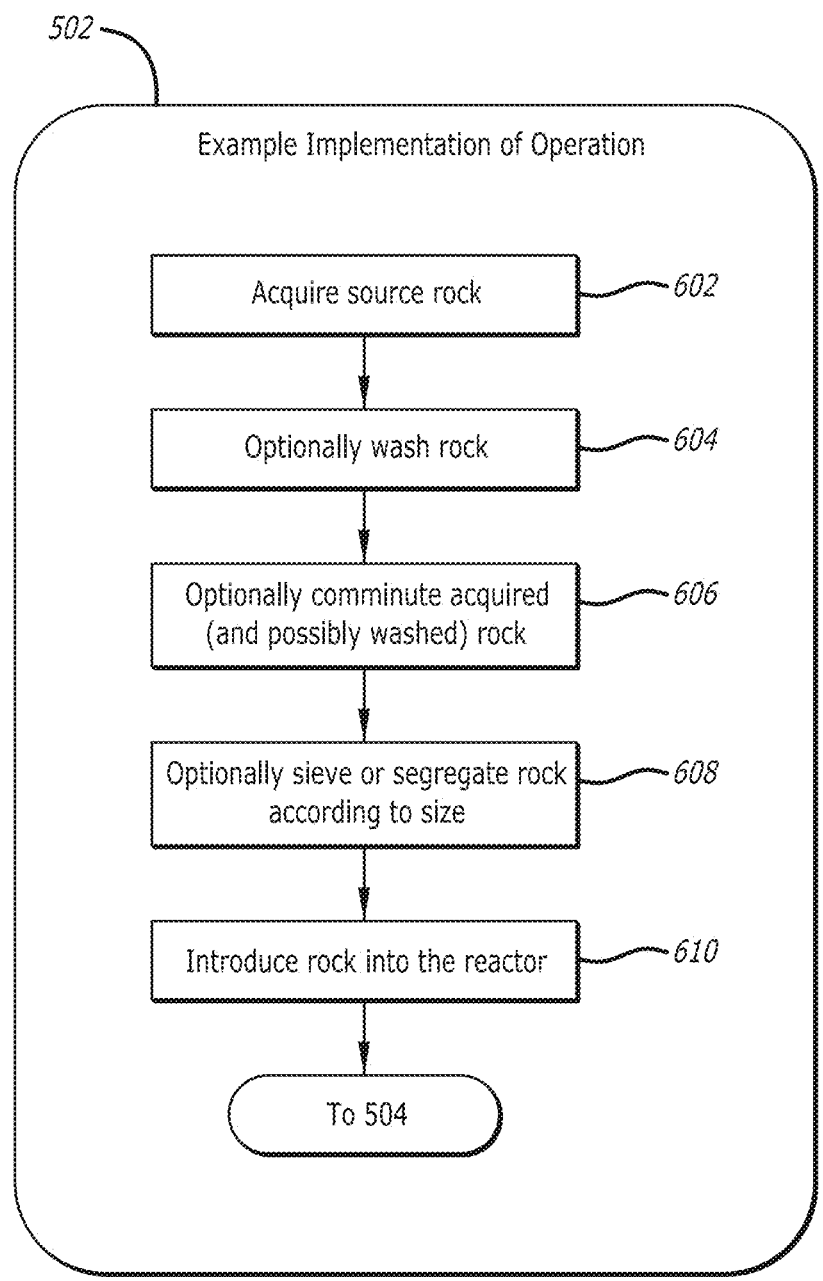
FIG. 6 illustrates an example flowchart for acquisition and preparation of source rock for reaction, in accordance with some example embodiments described herein.
Figure 7:
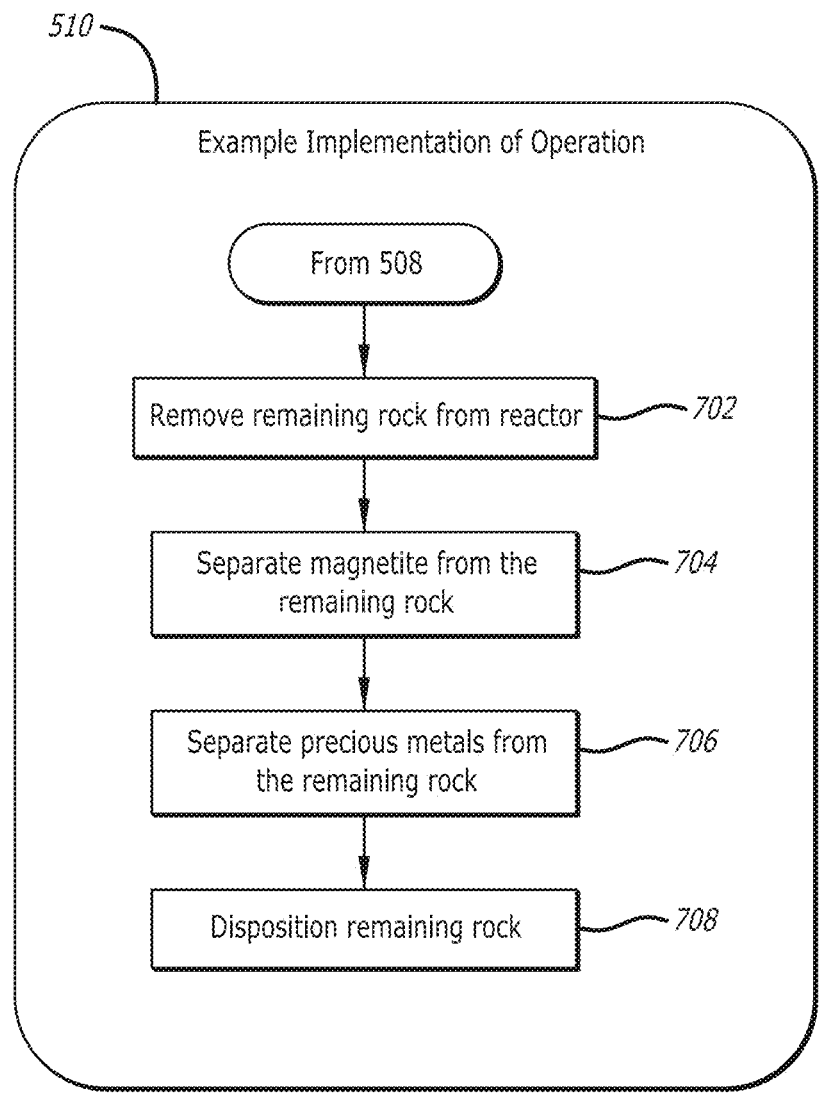
FIG. 7 illustrates an example flowchart for processing rock remaining following any carbon dioxide and/or water reactions, in accordance with some example embodiments described herein.

FIGS. 5, 6, and 7 illustrate flowcharts of various embodiments for enhancing the production of hydrogen gas, magnetite, magnesite, and scarce metal resources from mafic and ultramafic igneous rock that contains a mixture of olivine (fayalite and forsterite) and pyroxene (ferrosilite and enstatite) minerals. As previously disclosed in connection with FIG. 3, olivine- and/or pyroxene-rich ores may be found in numerous locations around the world. At block 502, such olivine- and/or pyroxene-rich ore may be acquired from geological sites containing high concentrations of such rocks in one or more of these areas. FIG. 6 illustrates this rock acquisition operation in greater detail. As shown at block 602, the olivine- and/or pyroxene-rich source rock may be acquired in any manner known to those skilled in the art, such as by underground mining, strip mining, quarrying, outcrop quarrying, or the use of waste (i.e., mine tailings), etc. The source rock may be transported, e.g., by barge, train, truck, etc., to a facility to further process the rock. In one or more embodiments, the source rock may be processed in proximity to the location where the rock is acquired. The source rock may be processed by crushing and/or grinding the rock at block 606 into smaller size fractions. In addition to creating uniform or near uniform sizing, such comminution also helps to expose the minerals, such as olivine (forsterite and fayalite) and pyroxene (enstatite and ferrosilite), that are contained within the rock. If the rock is processed in proximity to the geological site from which the rock originated, then the processed rock may then be transported to a facility having a system to further extract hydrogen, magnetite, and other valuable products from the ore according to a method disclosed herein (not shown in FIGS. 5 and 6). At block 608, the crushed and/or ground source rock may be further processed by sieving or otherwise segregating the rock according to size. In one or more embodiments, the crushed and/or ground rock may be washed with water or a slightly acidic solution to clean the surfaces thereof of dust, dirt, or other contaminants. As illustrated at block 604, such washing may be conducted before the rock is crushed and/or ground and can also benefit from agitation.

The crushed and/or ground rock is then introduced into a reactor at block 610 in which the rock is reacted with carbon dioxide and water to produce magnesium carbonate and hydrogen gas, among other products, in stoichiometric proportions via the carbonation reactions described in Table 2. The crushed/ground rock may be transported between and introduced into the reactor at block 610 by conveyor, by machinery placement, etc. A slightly acidic water solution, as previously described may be applied, e.g., by washing, spraying, or soaking, onto the outer surfaces of the rock. Such application may be before or after the rock is deposited in the reactor. The air in the reactor, including oxygen therein, may be evacuated from the sealed reactor with the rock disposed therein (e.g., by applying a vacuum to the reactor) or purged using reaction gas (e.g., $N_2$) prior to commencing the reaction. Returning to FIG. 5, block 504 describes that carbon dioxide ($CO_2$) is introduced into the reactor to begin the first reaction phase. The carbon dioxide may be gaseous or supercritical as previously described. A greater-than-stoichiometric portion of carbon dioxide is added as compared to the amount of rock (and specifically forsterite concentration therein) in the reactor in order to ensure that the carbon dioxide does not limit the carbonation reaction and to benefit from increased reactivity that is observed to occur at elevated pressures of $CO_2$ and/or super-critical $CO_2$. At block 504, the reactor is operated at one or more pre-selected temperatures and pressures, as described above, for a first residence time in order to sufficiently react the carbon dioxide with the forsterite mineral to produce magnesium carbonate and silicon dioxide reaction products. At the end of the first residence time, the gas phase from the reactor may be evacuated by, e.g., applying a vacuum or gas purging operation, to remove the excess unreacted carbon dioxide and any other gases evolved via the carbonation reactions of the first reaction phase.

Continuing with FIG. 5, at block 506, water is introduced to the reactor after the first residence time. In one or more embodiments, the water is a low oxygen fugacity water that is prepared or obtained as described in greater detail above. Again, a greater-than-stoichiometric portion of water (>~20 liters/kg of rock) is added as compared to the amount of rock (and specifically fayalite and/or ferrosilite concentrations therein) in the reactor in order to ensure that the water does not limit the serpentinization reaction. At block 506, the reactor is operated at one or more pre-selected temperatures and pressures, as described above, for a second residence time in order to sufficiently react the water with the fayalite and/or ferrosilite minerals (now having additional exposed surface area and more optimized chemical activity due to the first reaction phase) to produce at least hydrogen gas and magnetite reaction products.

At block 508, the gas phase is removed from the reactor either during or at the completion of the second reaction phase. This gas phase, which is rich in hydrogen gas (and may contain small quantities of trace gases, e.g., $N_2$, Ar, $CO_2$) may be further purified through gas separator 414 (as shown in FIG. 4A and FIG. 4B). The gas separator 414 may be a pressure swing adsorption unit, a membrane separation unit, a cryogenic separation unit, or any other gas separation unit known to those skilled in the art. If the gas phase was not evacuated from the reactor between the first reaction phase and the second reaction phase, then some carbon dioxide and/or other gases, e.g., reaction gases, may contaminate the hydrogen gas evolved in the reactor via the serpentinization reactions of the second reaction phase.

At block 510, the remaining rock within the reactor may be further processed to remove the magnesium carbonate/magnesite, the iron oxide/magnetite, the silicon dioxide, any remaining ore and/or slag material from the reactor. These operations are described in detail in connection with FIG. 7. Block 702 illustrates that the remaining rock in the reactor may be removed for further processing. Such removal may include removal by mechanical machinery, which picks up, rakes, or gravity feeds the material from the reactor into a container or onto a conveyor. In particular, at block 702 the solid reaction products (i.e., magnesite, magnetite, etc.), the remaining ore, and any slag material may be passed to a magnetic separator 416 (as shown in FIG. 4A and FIG. 4B) in order to separate the magnetite from the other materials via attraction of the magnetically susceptible iron oxide to a magnetic field (see block 704). The solid material removed from the reactor at block 702 may undergo additional crushing and/or grinding in order to create a fine powder to facilitate removal of valuable components thereof (not shown in FIGS. 5 and 7). At block 706, any precious or scarce metals that are now more concentrated in the remaining ore and/or gangue (collection of accessory mineral phases such as phosphates, sulfides, aluminum oxides, etc.) material after magnetite removal may be separated and removed based on density separation techniques such as heavy liquid separation or other gravity separation, or sluicing; an example of gravity separation using a gravity separator is shown in 480. Finally, as shown in block 708, the remaining rock, containing remaining magnesium carbonate (in which the carbon is permanently sequestered in the mineral phase), silicon dioxide, and any unreacted rock/ore may be used as an aggregate material and/or placed in landfill or otherwise disposed of. As noted previously, in some embodiments the magnesium carbonate and silicon dioxide may be separated (based on density separation techniques such as heavy liquids separation, or other gravity separation, or sluicing) and removed from the remaining rock/gangue (gangue: collection of accessory mineral phases such as phosphates, sulfides, aluminum oxides, etc.) materials for separate dispositioning.

FIGS. 5, 6, and 7 illustrates operations performed in various example embodiments. It will be understood that each flowchart block, and each combination of flowchart blocks, may be implemented by various means. The flowchart blocks support combinations of means for performing the specified functions and combinations of operations for performing the specified functions. In some embodiments, some of the operations above may be modified or further amplified. Furthermore, in some embodiments, additional optional operations may be included. Modifications, amplifications, or additions to the operations above may be performed in any order and in any combination.

Example Implementation

In one example embodiment, an ultramafic ore was reacted with carbon dioxide to sequester the carbon in the magnesium carbonate mineral phase and water to evolve hydrogen gas as well as produce magnetite. The example was conducted in three phases: 1) rock preparation; 2) water preparation; and 3) reaction process, each of which will be described in greater detail below. As part of the analysis of the overall system and method, the composition of the ore (i.e., olivine (forsterite and fayalite) and pyroxene (enstatite and ferrosilite) minerals), the reaction conditions to which the ore was subjected, and the characteristics of the carbonation/serpentinization reaction products were assessed. For instance, with respect to the ore composition, the mass, mineralogy, and geochemical composition of the bulk rock were evaluated by optical mineralogy, x-ray powder diffraction (XRD), and inductively coupled plasma mass spectrometry (ICP-MS) to evaluate the abundance of relevant constituents (e.g., fayalite, ferrosilite, FeO, MgO).

In the rock preparation phase, an ultramafic aggregate material that included mostly rock particles of approximately 1 cm in size were collected from four active quarries (namely, two quarries in Pennsylvania, one in Virginia, and one in Kentucky). The ultramafic aggregate material was disaggregated (i.e., lightly crushed/comminuted) initially with a rock hammer and then with a Spex Ball mill. The powdered material was then sieved using grates arranged and designed to pass 150-, 80-, and then 45-micron grains successively. This enabled experimentation to be conducted on at least three different grains sizes. Another material—a homogenized olivine mineral—was also purchased from a scientific supplier in California. This olivine material, which was homogenized for size and composition, had a uniform particle size of approximately 100 microns.

In the water preparation phase, three preparations were made. First, a low oxygen fugacity, high pH water was obtained by adding sodium bicarbonate and/or either sodium or potassium hydroxide to tap water in order to adjust the pH of the water to three levels 8.3, 9.7, and 11.1. As understood by those skilled in the art, oxygen fugacity ($fO_2$) is a measure of the amount of oxygen available to react with elements having multiple valence states—such as iron and carbon. A high oxygen fugacity is indicative of a high chemical potential of oxygen in the water. A lowered oxygen fugacity of water can be achieved or in a variety of manners (e.g., by the use of low oxygen fugacity water supply such as municipal wastewater, groundwater, mine water, or other wastewater stream). One method for simply and reliably generating low oxygen fugacity water utilizes a heated bed of copper filings at 125° C. through which the water is passed to reduce the oxygen fugacity of the water (i.e., decrease the amount of reactive oxygen in the water). Such a method was used in this example implementation. Second, a saline water was obtained by adding salt (sodium chloride) to tap water to create saline solutions ranging from 0.1 to 4.5 per mil. In preparation for carbon mineralization experiments, the pH of the saline water was adjusted to be between about 4.8 and about 6.5 using dilute HCl in a mixture of distilled water and a sodium acetate buffer.

For the reaction process, a single batch reactor (made of 316 stainless steel) was designed and built to conduct the carbonation and serpentinization reactions in both batch and sequential configurations. All of the reactions were performed in this closed stainless steel reaction vessel as a "batch" reaction (i.e., closed system) with the exception of a fluid sampling port that was opened periodically. For each experiment, whole samples (approximately 250 grams) were selected and sliced into two equally sliced approximately 125 grams of raw material and then placed in the gas-tight, stainless steel reaction vessels. In preparation for the introduction of carbon dioxide to the vessel, distilled water was lightly acidified using dilute hydrochloric acid and a sodium acetate buffer, and then mixed with salt (sodium chloride) to create a 0.1 to 4.5 per mil NaCl saline solution at ambient oxygen fugacity. This prepared water solution was then sprayed onto the powdered rock introduced into the reactor vessel. The prepared water solution provided a wet surface that enhanced the carbon dioxide reactivity with forsterite during the subsequent carbonation reactions.

In the first reaction phase, sequestration of carbon dioxide was targeted through carbonation reactions between the introduced carbon dioxide and the forsterite (and enstatite) in the ore. The acidic, saline water, prepared as described above, was applied to the powdered rock containing the forsterite mineral prior to placing the wetted (i.e., sprayed with water solution as described above) powdered rock into the stainless-steel reaction vessel. Before the introduction of carbon dioxide, the reactor vessel was evacuated using a mechanical rough pump to apply a vacuum and remove air from the reactor vessel, including ambient oxygen. Other embodiments involve flushing the vessel with inert gas (e.g., $N_2$) or reaction gas (e.g., $CO_2$ or mixtures thereof) to remove air.

Next, either carbon dioxide gas or mixtures of carbon dioxide gas, e.g., in a 4:1 ratio of carbon dioxide to nitrogen gas mixture, was introduced at room temperature and at an initial pressure of two bars (i.e., twice atmospheric pressure); in another embodiment of this disclosure, other ratios of $CO_2$ to $N_2$ can be utilized. The carbon dioxide used was an ultra-high purity carbon dioxide, such that the purity of carbon dioxide in the gas was greater than 99.9%, although mixtures with lower purity $CO_2$ can be utilized in various embodiments. The temperature inside the reactor vessel was then increased to 100° C., 150° C., 200° C., 250° C., 300° C., and 400° C. with the temperature being controlled by an external band heater and measured with a standard Omega K-wire thermocouple. At each temperature, the gas phase pressure was measured via the sampling port using a standard Omega 0 to 100 psi pressure gauge. At each temperature, an aliquot of gas measured using a Stanford Research Systems residual gas analyzer ("quadrupole mass spectrometer") and SRI gas chromatograph fitted with a thermocouple detector. The total pressure of hydrogen was calculated by determining the product of the percentage of hydrogen gas measured using the residual gas analyzer and/or gas chromatograph with the pressure compared to atmospheric pressure and assuming PV=nRT.

The kinetic rate of carbon mineralization appeared to increase by ~1.6 times when temperatures increased from 150° C. to 300° C., but additional increases in the rate of $CO_2$ mineralization were not statistically significant between 300° C. and 400° C. over reaction times of ~18 hours in the batch experiments. Next, while holding a constant temperature of 250° C., the pressure was increased to 5, 10, 25, and 50 bars of carbon dioxide. At each step, the gas phase pressure via the sampling port was monitored using a standard Omega 0 to 100 psi pressure gauge on an attached expansion volume (to ensure the sample pressure was in the range of the available pressure gauge). For each pressure, an aliquot of gas was also measured using an SRS quadrupole mass spectrometer and SRI gas chromatograph fitted with a thermocouple detector after pressure reduction by expansion to a pre-evacuated sample chamber via the sampling port. The rate of carbon mineralization appears to increase by ~2.7 times between a pressure of 5 bars and 50 bars at 250° C.

The preliminary results from the first reaction phase indicate that the kinetics of carbon dioxide mineralization increase with smaller grain sizes of the ore. There was a 23% improvement in the reduction of $CO_2$ concentrations between 150 and 25 microns when holding temperature constant at 250° C., as determined based on $CO_2$ pressure and concentration measurements and the mass of rock mineralized in the reaction vessel. While it is suspected that the removal of air will enhance the kinetics of carbon mineralization, at least one run without air/oxygen removal from the reactor vessel at the start of the first reaction phase did not appear to noticeably affect the carbonization reaction. Increasing both the temperature and the pressure of the reaction conditions increased the rate of $CO_2$ mineralization up through at least 300° C. and 50 bars over reaction times of ~18 hours in the batch experiments. Based on the plateau in the pressure of the reaction, these conditions are assumed to approach thermodynamic equilibrium in batch conditions between 12 and 18 hours, with variability observed throughout various experimental conditions (i.e., generally less time at higher temperature and pressure).

During temperature increases from 100° C. to 300° C. at a constant pressure of 10 bars, the amount of mineralization increased from 14% additional mass (after 24 hours in a batch reactor) to 27%, representing a 92% increase in the mass of rock resulting from carbon mineralization. During pressure increases from 1 to 50 bar at a constant temperature of 250° C., the amount of mineralization increased from 4.1% additional mass (after 24 hours in a batch reactor) to 18.9%, representing a 4.6 times increase in the mass of rock resulting from carbon mineralization. Rotary kiln, fluidized bed, and toroidal bed processes were not evaluated in this process, but can be expected to substantially increase both the reaction rates and total efficiency of mineralization as compared to the batch process, even while temperature and pressure effects are expected to be similar to those in the batch process.

In another experimental run, supercritical carbon dioxide was used in the reactor during the first reaction phase. Preliminary results indicate that the supercritical $CO_2$ injected into the reactor at 10 bars and 250° C. reached a pressure plateau 4.5 hours (18.8%) faster than gaseous $CO_2$. Thus, the carbon sequestration from this disclosed ex situ carbonation reaction may be maximized or enhanced while accounting for temperature and pressure in addition to other cost-intensive variables, such as energy input, material handling, and chemical processing costs. After the first reaction phase, the solid contents of the reactor were weighed. Based on a mass increase of between 39.3 grams (15.7%) at 150° C. at 5 bar and 101.6 grams (40.6%) at 300° C. at 50 bar, the abundance of total carbon mineralization was determined, which was verified using optical microscopy. Magnesite (i.e., magnesium carbonate), which was not observed in the initial experimental material, was identified, as expected based on the stoichiometry of the carbonation reaction resulting in a pre-concentration of an iron-rich iron-silica (fayalite and/or ferrosilite) phase prior to the second reaction phase.

In the second reaction phase, liberation of the hydrogen was targeted through serpentinization/hydration reactions between the introduced water and the fayalite and/or ferrosilite (mixture in the four natural samples and exclusively olivine one prepared sample) in the remaining ore. Before the introduction of water with respect to the serpentinization reactions, the reactor vessel was evacuated using a mechanical rough pump to apply a vacuum and remove air from the reactor vessel including any remaining introduced carbon dioxide. Next, low oxygen fugacity (i.e., negative Eh value or negative electric potential), high pH (i.e., pH ranging between 8.3 and 11.1 using sodium bicarbonate or either sodium or potassium hydroxide), and saline (about 0.1 to 4.5 per mil sodium chloride (NaCl)) water, prepared as described above, was then introduced at room temperature and ambient atmospheric pressure into reactor vessel containing the remaining ore (i.e., unreacted ore consisting of the iron silicate phase, magnesium carbonate, silicon dioxide, residual olivine, pyroxene, and other accessory mineral phases).

The initial gas phase pressure was measured/recorded via the sampling port using the standard Omega 0 to 100 psi pressure gauge. The temperature inside the reactor vessel was then increased to 50° C., 100° C., 150° C., 200° C., 250° C., 300° C., and 400° C. with the temperature being controlled by the external band heater and monitored with an Omega K-wire thermocouple. At each temperature step, the gas phase pressure was measured via the sampling port using the standard Omega 0 to 100 psi pressure gauge. At each temperature, an aliquot of gas was measured using a Stanford Research Systems residual gas analyzer ("quadrupole mass spectrometer") and SRI gas chromatograph fitted with a thermocouple detector. The total pressure of hydrogen (and other gases) was calculated by determining the product of the percentage of hydrogen gas measured using the residual gas analyzer and/or gas chromatograph with the pressure compared to atmospheric pressure and assuming PV=nRT.

The preliminary results from the second reaction phase indicated that the kinetics of hydrogen evolution increase with smaller grain sizes of the ore. There was a 5.2 times improvement in the yield of $H_2$ between the temperature steps of 50° C. and 100° C. when holding a constant pressure of 10 bars as determined based on $H_2$ partial pressure over a time interval of 18 hours. There was a 7.3 times improvement in the yield of $H_2$ concentrations between the temperature steps of 100° C. and 400° C. when holding a constant pressure of 10 bars as determined based on $H_2$ partial pressure over a time interval of 18 hours. The yield of $H_2$ increased with pressure, but not to the same extent as temperature. There was a 31% times improvement in the yield of $H_2$ between 1 and 5 bars at a constant temperature of 250° C., and a 1.8 times increase in the yield of $H_2$ between 5 and 40 bars at a constant temperature of 250° C. as determined based on $H_2$ partial pressure over a time interval of 18 hours. When compared to serpentinization reactions that were not preceded by the two-step carbonation reaction, the kinetic rates of the serpentinization reaction increase by 21% at 150° C. and up to 87% at 250° C. conducted at a constant pressure of 20 bars as compared to experiments performed at 100° C. This change is believed to be due to the carbonation-driven comminution of the ore that facilitated the initial breakdown of the rock/ore as well as the pre-concentration of the iron silicate mineral phases. The highest increase in the yield of $H_2$ was 1.8 times above the yield observed at 100° C. and was observed at a temperature step of 200° C. following density separation of $SiO_2$ and $MgCO_3$ from the denser iron silicates by laboratory sluicing; this step yielded total $H_2$ production of 0.576 mol $H_2$/kg. Each increasing temperature step demonstrated an improvement in the purity of the hydrogen gas evolved; variable mixtures of $N_2$, Ar and minor $CO_2$ were observed in both the 50° C. and 100° C. temperature steps, which was less than 5% in the non-condensable fraction at temperatures above 150° C. with the exception of one sample at 400° C., which yielded 6.7% $CO_2$.

Along with the composition (%), the total pressure of the hydrogen gas that was formed by the reaction increased with higher temperatures, indicating a progressive increase in the kinetic rates and the total yield of hydrogen generation with higher temperature. Although this result was theoretically expected, it differentiates hydrogen produced by example embodiments described herein from hydrogen generated by natural systems wherein the occurrence of $CO_2$, $HCO_3^-$, or other forms of carbon in the subsurface can begin to react with hydrogen at ~150° C., which "short circuits" carbon-negative hydrogen generation by the formation of abiogenic methane via the Sabatier reaction (i.e., $CO_2+4H_2 \rightarrow CH_4+2H_2O$), wherein $CO_2$ can be available as gaseous phase $CO_2$ or be liberated from dissolved inorganic carbon phases in pore fluids by the following reaction: $H^++HCO_3^- \rightarrow CO_2+H_2O$).

A comparison of the disclosed two-step reaction was performed by further comparison to two base case single step reactions. The first base case comparison was a one-step reaction at a pH of 6.0 with temperatures increased from room temperature to 50° C., 100° C., 150° C., 200° C., 250° C., 300° C., and 400° C. The highest $H_2$ yield at this pH was less than 0.011 mol $H_2$/kg at 400° C., which was expected based on the mildly acidic conditions. The second base case comparison was a one-step reaction at a pH of 8.0 with temperatures increased from room temperature to 50° C., 100° C., 150° C., 200° C., 250° C., 300° C., and 400° C. At this pH and holding pressure constant at 20 bars, $H_2$ yield in the single step reaction ranged from below detection limits at 50° C. at 18 hours to 0.051 mol $H_2$/kg at 100° C. and up to 0.349 mol $H_2$/kg at 400° C. For comparison, the highest value observed at the 400° C. in the single-step base case was 69.6% lower than the highest yield in the two-step reaction described above. Thus, the hydrogen gas production from this disclosed ex situ serpentinization reaction may be maximized or enhanced while accounting for temperature and pressure in addition to other cost-intensive variables, such as energy input, material handling, and chemical processing costs, especially by precluding interactions between $H_2$ and labile carbon (i.e., $CO_2$).

After the sequential first and second reaction phases (i.e., the carbonation and serpentinization reactions) were completed in the reaction vessel, the mass (i.e., weight), mineralogy, and geochemical composition of the remaining bulk rock were determined by optical mineralogy and ICP-MS to evaluate the abundance (or lack) of relevant constituents (e.g., fayalite, ferrosilite, FeO, MgO, etc.). While visible olivine and pyroxene were still observed along with minor serpentine, the amount of magnetite observed was significantly higher (11-171% based on the mass of the separatable magnetic components) in the sequential reaction (i.e., first reaction phase followed by second reaction phase) than when the reaction was done without pre-concentration of the fayalite and/or ferrosilite minerals and control of reaction conditions, e.g., pH, low oxygen control, temperature. There was a 11% increase in the yield of magnetite between the temperature steps of 50° C. and 100° C. and approximately 13% between 100° C. and 150° C., while there was 1.7 times more magnetite recovered magnetically when comparing the 300° C. and 100° C. steps when holding a constant pressure of 10 bars over a time interval of 18 hours. Based on the stoichiometry of the reactions and these observations, it is apparent that an increased generation of magnetite is coupled with and inextricably linked to an increased generation of hydrogen (as was expected from the stoichiometric serpentinization reaction). These results support the stoichiometric modeling of both carbon dioxide mineralization (via carbonation) and hydrogen production (via serpentinization/hydration reactions). Thus, magnetite may be produced as a co-product of hydrogen generation/evolution (or vice versa based on the chosen business method).

Additional analysis of the residual material identified highly elevated metal enrichments that included phosphates, aluminum oxides, and other poorly defined solids in the gangue ("mineral slag"). For example, lanthanum (one rare earth element) demonstrated an average concentration of 8.2 ppm in the bulk sample of ultramafic rock from the Pennsylvania quarry and 187.1 ppm in the residual gangue (largely aluminum oxide, phosphates and sulfides corresponding to roughly 2-4% of the total material). Similarly, nickel and cobalt concentrations were 133.9 and 78.2 ppm in a bulk sample of ultramafic rock from the same Pennsylvania quarry and 1,426 and 976.8 ppm in the residual gangue (largely aluminum oxide and sulfides). Separation of these metal enrichments may be accomplished by density separation techniques such as heavy liquid separation or other gravity separation, or sluicing or other methods known to those skilled in the art.

The overall results indicate that, in the pursuit of carbon neutral or even negative carbon hydrogen production, the sequential carbonation and serpentinization reactions phases disclosed herein provide several reaction products (e.g., magnetite, rare earth elements, and other scarce metals) of economic and societal value in the pursuit of a lower carbon economy in addition to carbon sequestration and hydrogen evolution. Moreover, there exist a range of conditions where each reaction may be enhanced that varies only slightly with different rock contents, such that the reactions are more or less stable in the conditions described above among various sources of ultramafic and mafic rocks.

As briefly discussed above, several reaction products have been identified from the staged, sequential carbonation and serpentinization reactions disclosed herein. Four reaction products in particular have the potential to be economically viable, especially when enhanced or enabled by steps, procedures, reaction conditions described herein that enhance the rock drivers comminution and thermodynamic toward idealized "carbonation" and serpentinization/hydration reactions. Adding to their economic viability, there may be revenue entitlements tied to the production of these reaction products, such as tax credits, sale of carbon credits, tax incentives, etc. The four products include: magnesite/aggregate, "green" or "golden" hydrogen (net carbon negative), magnetite, and scarce metals, and each will be discussed further hereinbelow.

Magnesite

The controlled ex situ generation of magnesite (magnesium carbonate) by enhancing "water-rock" serpentinization/hydration reactions involving mined, quarried, or waste (e.g., mine tailings) mafic or ultramafic rock and products provides an economic and carbon neutral (or even carbon negative) pathway for scalable magnesite and rock aggregate formation. This process can also economically increase the volume and mass of the rock (stoichiometric assessment of suitable mafic/ultramafic ores suggest the mass can increase by 34 to >60% (or 0.34 to >0.60 kg/kg of rock or 340 kg to >600 kg/metric ton of rock), while experimental results suggested at increase of 0.104 kg/kg (300° C. at 50 bars in the bulk rock obtained from the Pennsylvania quarry) to 0.237 kg/kg (300° C. at 50 bars in the pure olivine test sample). These values are expected to increase further by moving from a batch to dynamic reaction process (e.g., rotary kiln, fluidized bed, toroidal bed, or other similar processes) of rock compared to the original material introduced into the batch reactor.

As disclosed, water having a pH of between about 4.8 to about 6.5 may be mixed with carbon dioxide in controlled conditions (e.g., under atmospheric or oxidizing conditions) to chemically break down the magnesium-rich silicate (i.e., forsterite) portion of mafic and ultramafic rocks. This reaction may be enhanced at temperatures of between about 150° C. to about 300° C. to 400° C. (although our experiment displayed a plateau in increased mineralization at 300° C.) and at pressures of at least up to 50 bars to produce magnesite. This carbonation process permanently sequesters carbon dioxide through the precipitation of magnesite mineral phases and other carbonate minerals, which can be used directly or as rock aggregate.

The successful conversion of magnesium-silicate into magnesium carbonate and other carbonate minerals also allows the possibility to remove the bulk of the rock mass (following previously described density separation techniques) that can subsequently be either separated from residual iron-silicates or be separated prior to serpentinization/hydration reactions. The step of concentrating the iron silicate phase can further concentrate scarce metals (e.g., nickel, cobalt, rare earth elements) in other mineral forms (e.g., aluminum oxides, phosphates, and sulfides). This carbonation process is conducted first such that sequential serpentinization reactions may more readily and abundantly produce the reaction products of magnetite and hydrogen gas without the formation of accessory/competitive phases and enhance comminution.

The importance of scalable and carbon negative (or carbon neutral) magnesium carbonate (magnesite) production has direct bearing on the numerous current uses of magnesite, including, but not limited to, pharmaceutical applications, agricultural lime and fertilizers (to neutralize acidification caused by fertilizer use), raw materials for ceramic and ceramic brick, and flux used in iron and steel manufacturing. Magnesite may also be used as a partial lime substitute to enable lower carbon emissions that result from the lower temperatures required to make magnesium oxide (MgO) as compared to calcium oxide (CaO). Further, magnesite can be used as a carbon negative concrete filler and cement or aggregate substitute in concrete.

Green/Golden Hydrogen

Hydration reactions involving iron-silicates (e.g., fayalite, ferrosilite) may be used to generate "green" (i.e., carbon neutral) or "golden" (i.e., carbon negative) hydrogen ex situ from mined, quarried, or waste streams of olivine- and/or pyroxene-rich ores, such as mafic and ultramafic rock. In one or more embodiments of the systems and method disclosed herein, the ex situ generation of carbon-negative hydrogen is directed to a two-reaction step/phase process in which: (1) carbon dioxide is first introduced in a gaseous or supercritical state into pulverized rock (approximately <150 microns) that has been wetted with a water preparation having a pH of between about 4.8 and about 6; and (2) water with a low oxygen fugacity (e.g., obtained from municipal wastewater, geothermal water, or other industrial water uses or made by reacting tap water over a bed of copper at 125° C.), a pH of between 8.3 and about 11.1 (the specified pH attained by adding sodium bicarbonate or either sodium or potassium hydroxide to the water but such water pH may be found in natural sources of water and wastewater) across a temperature range of between about 60° C. and about 400° C.

The removal of a substantial portion of magnesium component from the powdered or comminuted rock in the first reaction phase increases the chemical (reaction) potential of the iron-rich portion in the second reaction phase. Stoichiometric calculations suggest that the chemical activity can be increased by up to eight times, while improvements of approaching a factor of two were observed in experiments; it is anticipated that the chemical activity and kinetics can be further increased by transitioning from a batch to dynamic process. Indeed, the rates of hydrogen production are significantly greater (nearly 70% greater) than in a method in which the iron-rich silicate mineral is reacted without the precursor step of carbon dioxide mineralization compared to a suitable base case for natural reactions or other one step engineered reaction processes.

A significant advantage of various embodiments disclosed herein is that the systems and methods of such embodiments can be set up for ex situ operation almost anywhere in the world due to the vast and far-reaching reserves of mafic and ultramafic rock and availability of water and chemicals for amendment of pH and Eh of the water. Conversely, hydrogen formation in a more conventional manner, such as by natural gas reforming, is limited by natural gas availability, among other constraints that are often carbon intensive. Even if the produced carbon dioxide is sequestered, the hydrogen would be considered "blue," not "green" or "golden."

Magnetite

The controlled ex situ generation of magnetite by enhancing "water-rock serpentinization" reactions on mined, quarried, or waste streams of olivine- and/or pyroxene-rich ores and other materials provides an economic and carbon neutral (or even carbon negative) pathway for the production of magnetite while also enabling commensurate carbon dioxide sequestration through carbonate mineralization. While carbonation and serpentinization reactions are themselves naturally occurring, embodiments of the systems and methods disclosed herein are directed to enhanced magnetite production through the sequential ordering of these reactions in a controlled ex situ environment to limit alternative and undesirable chemical reactions capable of producing serpentine, brucite, or asbestos.

In various embodiments disclosed herein, the ex situ generation of magnetite is directed to a two-reaction step/phase process in which: (1) carbon dioxide is first introduced in a gaseous or supercritical state in the presence of pulverized rock (approximately <150 microns) that has been wetted with a water preparation having a pH of between about 4.8 and about 6.5; and (2) water with a low oxygen fugacity (e.g., obtained from municipal wastewater, geothermal water, treated groundwater or other industrial water uses or made by reacting tap water over a bed of copper at 125° C.) having a pH of between 8.3 and about 11.1 (the specified pH attained by adding sodium bicarbonate or either sodium or potassium hydroxide to the water but such water pH may be found in natural sources of water and wastewater) is introduced across a temperature range of between about 80° C. and about 400° C. The two-step reaction at temperature >300° C. improves magnetite recovery by ~1.7 times compared to lower temperatures and a suitable base case. Further, removal of a substantial portion of magnesium component from the powdered or comminuted rock in the first reaction step/phase increases the chemical (reaction) potential of the iron-rich portion in the second reaction step/phase (e.g., by approximately 23-800%), thereby increasing the thermodynamic drivers of magnetite generation several times. Thus, the generation of preferred mineral products, such as magnetite and hydrogen, is increased when compared to the random or undesired mineral species typically generated in natural systems. Indeed, the rates of magnetite production are significantly greater, and the targeted production of these specific chemical species is more reliable (e.g., the formation of serpentine, brucite, or asbestos are reduced) than in a method in which the iron-rich silicate mineral is reacted without the precursor step of carbon dioxide mineralization or in which both $CO_2$ and water are reacted together (which occurs in natural systems).

The Direct Reduction Iron (DRI) process is the only commercial low carbon emissions iron making process, and it is a precursor to steel manufacturing. The DRI process requires high-grade iron ore (greater than approximately 67% iron), which is in short supply in natural iron ores worldwide. Such limited access to magnetite (or other similarly iron-rich mineral phases) limits the potential to produce iron or steel using the DRI process, which is an important pathway for reducing carbon dioxide emissions in the steel industry. The systems and methods disclosed herein may produce high-grade iron ore (magnetite) in vast quantities due to the prolific occurrence of mafic and ultramafic rock, which accounts for greater than 10% of the continental crust and the vast majority of the oceanic crust. Moreover, the carbon dioxide sequestration tax credits and/or carbon credit sales associated with magnesite production may be attached to the magnetite output of these systems and methods. Thus, embodiments disclosed herein may increase the availability of high-grade iron ore to the steel industry along with a carbon credit, which may also result in the "greening" of the steel industry worldwide. Notably, the collective co-production (at one physical site) of magnesite, magnetite, and hydrogen gas also satisfies three requirements (i.e., iron-rich iron ore; reductive gas species/hydrogen; and magnesite flux) of iron making processes.

Scarce Metals

Elevated concentrations of certain relatively scarce metals (e.g., nickel, cobalt, chromium, and rare earth elements) in mafic and ultramafic rocks may be liberated and more easily recovered ex situ through sequential carbon sequestration/carbonation and "water-rock" serpentinization reactions involving mined, quarried, or waste mafic or ultramafic rock/ore. These scarce, and in some cases strategic, metals are critical for renewable energy and energy storage and are often derived from mining of weathered or processed minerals in more energy intensive steps (i.e., dehydration of asbestos back to forsterite). However, the disclosed system and method provides an economic and carbon neutral (or even carbon negative) pathway for the production of these scarce metals, while also enabling carbon sequestration by mineralization of carbon dioxide. The reaction of gaseous or supercritical carbon dioxide with forsterite chemically breaks down these magnesium-rich silicate minerals and simultaneously sequesters carbon from carbon dioxide, while the reaction of water with fayalite and/or ferrosilite chemically breaks down the iron-rich silicate minerals and simultaneously produces magnetite and hydrogen gas. With the breakdown of these minerals, the remaining scarce metals are concentrated in the remaining unreacted ore and gangue (i.e., aluminosilicates, phosphates, accessory oxides, clay, etc.). Thus, the kinetic rates of the reactions of one or more embodiments disclosed herein and total metal recovery (i.e., higher concentrations in the starting composition) are much increased over natural chemical weathering of mafic and ultramafic rock. Further, the concentration of scarce metals is increased in the gangue, and the carbon footprint of "mining" or recovering these precious metals (and their derivative utilization in mobility and energy storage) is reduced. Therefore, the sequential carbonation and serpentinization reactions may provide for what is, in essence, a carbon negative mining of scarce and strategic metals.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for sequestering carbon and producing hydrogen and magnetite from rock, the system comprising:
   a source of ore containing olivine or pyroxene;
   a reactor having an inlet that receives ore particles and at least one outlet, the reactor also having at least one additional inlet through which one or more of carbon dioxide or water is introduced, the reactor operable at a first temperature for a first residence time to react carbon dioxide that enters the reactor through the at least one additional inlet with the ore particles to generate magnesium carbonate, the reactor also operable at a second temperature for a second residence time to react water that enters the reactor through the at least one additional inlet with the ore particles to generate magnetite and hydrogen gas; and
   a gas separator that is connected to and in fluid communication with the at least one outlet of the reactor, the gas separator configured to separate hydrogen gas from gases that exit the reactor through the at least one outlet.

2. The system of claim 1, further comprising a crusher that physically reduces a particle size of the ore introduced therein from the source.

3. The system of claim 2, further comprising:
   a sieve that receives the ore from the crusher and that allows the ore particles up to a pre-selected size to pass into the reactor,
   wherein the inlet that receives the ore particles is configurable to only receive, from the sieve, the ore particles having a size at or below to the pre-selected size.

4. The system of claim 3, wherein the pre-selected size comprises a size of between about 25 microns and about 150 microns.

5. The system of claim 1, wherein a pressure inside the reactor during the second residence time is at or above about 1 bar of carbon dioxide.

6. The system of claim 5, wherein a pressure inside the reactor during the second residence time is at or above 5 bars of carbon dioxide.

7. The system of claim 6, wherein a pressure inside the reactor during the second residence time is at or above 10 bars of carbon dioxide.

8. The system of claim 1, further comprising a magnetic separator that receives material from the at least one outlet of the reactor, the magnetic separator having a magnet that attracts the magnetite and thereby separates the magnetite from the material.

9. The system of claim 1, further comprising a washer that applies either additional water or an acidic solution to the ore particles prior to their reaction with the carbon dioxide.

10. The system of claim 1, further comprising a separator that separates at least one of nickel, cobalt, chromium, or rare earth elements from any remaining ore particles removed from the reactor.

11. The system of claim 1, wherein the reactor includes a first reactor into which the carbon dioxide is introduced and a second reactor into which the water is introduced, the first reactor being operable at the first temperature for the first residence time to react the carbon dioxide that enters the first reactor through the at least one additional inlet with the ore particles, and the second reactor being operable at the second temperature for the second residence time to react the water that enters the second reactor with any remaining ore particles introduced into the second reactor from the first reactor.

12. The system of claim 1, wherein the water has a pH of between about 8.3 and about 11.1.

13. The system of claim 1, wherein at least one of the first temperature and the second temperature is no greater than 400° C.

14. The system of claim 1, wherein at least one of the first temperature and the second temperature is no greater than 300° C.

15. The system of claim 1, wherein a pressure inside the reactor during the first residence time is at or above about 5 bars of carbon dioxide.

16. The system of claim 1, wherein the carbon dioxide that is introduced into the reactor is gaseous or supercritical carbon dioxide.

17. The system of claim 1, further comprising a separator that separates at least one of phosphates, aluminum oxides, precious metals, and other mineral gangue from any remaining ore particles removed from the reactor.

18. A method for generating hydrogen and magnetite from rock, the method comprising:
   obtaining an ore containing olivine or pyroxene;
   introducing the ore into a reactor that is operable at temperatures above ambient temperature and pressures above atmospheric pressure;
   introducing water into the reactor at a particular temperature for a particular residence time to react with the ore to generate magnetite and hydrogen gas;
   removing, from the reactor, a gas mixture that includes the hydrogen gas;
   separating the hydrogen gas from the gas mixture; and
   removing any remaining ore from the reactor.

19. The method of claim 18, further comprising washing the ore with either additional water or an acidic solution prior to comminuting the ore into the smaller size fractions.

20. The method of claim 18, further comprising:
   sieving the ore prior to introducing the ore into the reactor to allow ore particles up to a pre-selected size to pass into the reactor, wherein introducing the ore into the reactor comprises introducing, into the reactor, only a subset of the ore having particles up to the pre-selected size.

* * * * *